(12) United States Patent
Mass et al.

(10) Patent No.: US 11,726,289 B1
(45) Date of Patent: *Aug. 15, 2023

(54) COMPONENTS FOR FIBER OPTIC CABLE INSTALLATION ON A POWERLINE CONDUCTOR

(71) Applicant: Meta Platforms, Inc., Menlo Park, CA (US)

(72) Inventors: James A. Mass, North Royalton, OH (US); Robert Olding, Menlo Park, CA (US); Karthik Yogeeswaran, San Carlos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,154

(22) Filed: Jun. 2, 2022

Related U.S. Application Data

(63) Continuation of application No. 17/102,383, filed on Nov. 23, 2020, now Pat. No. 11,353,672.

(Continued)

(51) Int. Cl.
　　*G02B 6/00* (2006.01)
　　*G02B 6/44* (2006.01)
　　*H01B 9/00* (2006.01)

(52) U.S. Cl.
　　CPC ......... *G02B 6/4455* (2013.01); *G02B 6/4452* (2013.01); *G02B 6/4478* (2013.01); *H01B 9/005* (2013.01)

(58) Field of Classification Search
　　CPC .. G02B 6/4455; G02B 6/4452; G02B 6/4478; G02B 6/00; H01B 9/005
　　See application file for complete search history.

(56) References Cited

U.S. PATENT DOCUMENTS

| 4,833,871 A | 5/1989 | Ogawa et al. |
| 5,109,658 A | 5/1992 | Garner |

(Continued)

FOREIGN PATENT DOCUMENTS

| DE | 19820037 A1 | 11/1999 |
| FR | 2890756 A1 | 3/2007 |
| JP | 2000292666 A | 10/2000 |

OTHER PUBLICATIONS

AFL, "Lightweight Retro-fit Fibre Optic Cable," AccessWrap, May 9, 2012, 1 Page.

(Continued)

*Primary Examiner* — Jennifer Doan
(74) *Attorney, Agent, or Firm* — Greenberg Traurig, LLP

(57) ABSTRACT

The disclosed fiber optic cable splice case may include (1) an outer enclosure with a plurality of cable funnels defining paths from an exterior to an interior of the outer enclosure, (2) a clamp connected to the exterior of the outer enclosure, where the clamp attaches the outer enclosure to a powerline conductor, and (3) an inner enclosure positioned at least partially within, and rotatably coupled to, the outer enclosure, where the inner enclosure defines (a) a splice cavity within the inner enclosure, where the cavity is configured to store an optical fiber splice tray for coupling corresponding optical fibers of each of a pair of fiber optic cable segments and (b) a cable channel about an exterior of the inner enclosure, where the cable channel carries a portion of each of the pair of segments between the funnels and the cavity. Various other components and methods are also disclosed.

20 Claims, 26 Drawing Sheets

Related U.S. Application Data

(60) Provisional application No. 62/941,615, filed on Nov. 27, 2019.

(56) References Cited

U.S. PATENT DOCUMENTS

| | | | |
|---|---|---|---|
| 5,727,373 | A | 3/1998 | Appleford et al. |
| 6,000,209 | A | 12/1999 | Ito et al. |
| 6,813,421 | B2 | 11/2004 | Lail et al. |
| 6,813,422 | B1 | 11/2004 | Krishnamurthy et al. |
| 8,005,333 | B2 * | 8/2011 | Mullaney ............ G02B 6/4446 174/50 |
| 8,831,394 | B2 | 9/2014 | Kimbrell et al. |
| 8,919,092 | B2 | 12/2014 | Figenschou et al. |
| 9,051,153 | B2 | 6/2015 | Lichoulas et al. |
| 11,169,351 | B2 | 11/2021 | Kuriloff et al. |
| 11,353,672 | B1 * | 6/2022 | Mass .................... G02B 6/483 |
| 2003/0006332 | A1 | 1/2003 | Appleby et al. |
| 2004/0071416 | A1 | 4/2004 | Militaru |
| 2004/0247271 | A1 | 12/2004 | Skovgaard et al. |
| 2008/0101753 | A1 | 5/2008 | Suzuki et al. |
| 2008/0130010 | A1 | 6/2008 | Williams |
| 2012/0211447 | A1 | 8/2012 | Anderson et al. |
| 2012/0308189 | A1 | 12/2012 | Kimbrell et al. |
| 2016/0011366 | A1 | 1/2016 | Tsukamoto et al. |
| 2016/0215130 | A1 | 7/2016 | Esseghir et al. |
| 2016/0236857 | A1 | 8/2016 | Adams et al. |
| 2017/0176703 | A1 | 6/2017 | Baker et al. |
| 2018/0074214 | A1 | 3/2018 | Magne et al. |
| 2020/0358268 | A1 | 11/2020 | Kuriloff et al. |

OTHER PUBLICATIONS

"Carbon Black," Wikipedia, Oct. 23, 2020, 6 pages, Retrieved from the Internet: URL: https://en.wikipedia.org/w/index.php?title=Carbon_black&oldid=985037981.

"Cross-linked Polyethylene," Wikipedia, Sep. 19, 2020, 15 pages, Retrieved from the Internet: URL: https://en.wikipedia.org/w/index.php?title=Cross-inked_polyethylene&oldid=979194209.

"Fiber Optic Cable," SkyWrap, AFL, Jun. 25, 2014, pp. 59-60.

"Frequently Asked Questions," AFL, SkyWrap Information, Jul. 23, 2013, pp. 1-2.

International Search Report and Written Opinion for International Application No. PCT/US2020/032046, dated Jul. 22, 2020, 9 pages.

International Search Report and Written Opinion for International Application No. PCT/US2020/032103, dated Aug. 25, 2020, 10 Pages.

"Kevlar," Wikipedia, Sep. 19, 2020, 11 pages, Retrieved from the Internet: URL: https://en.wikipedia.org/w/index.php?title=Kevlar&oldid=979269720.

"Polyethylene," Wikipedia, Oct. 16, 2020, 17 pages, Retrieved from the Internet: URL: https://en.wikipedia.org/w/index.php?title=Polyethylene&oldid=983809595.

"Swellcoat Blocker," Fiberline, Oil & Gas, Fiber-Line Waterblocking Yarns, Oct. 27, 2020, 1 Page.

* cited by examiner

COMPONENTS FOR FIBER OPTIC CABLE INSTALLATION ON A POWERLINE CONDUCTOR

CROSS REFERENCE TO RELATED APPLICATIONS

This application is a continuation of U.S. Non-Provisional patent application Ser. No. 17/102,383, filed 23 Nov. 2020, which claims the benefit of U.S. Provisional Application No. 62/941,615, filed 27 Nov. 2019, the disclosure of each of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
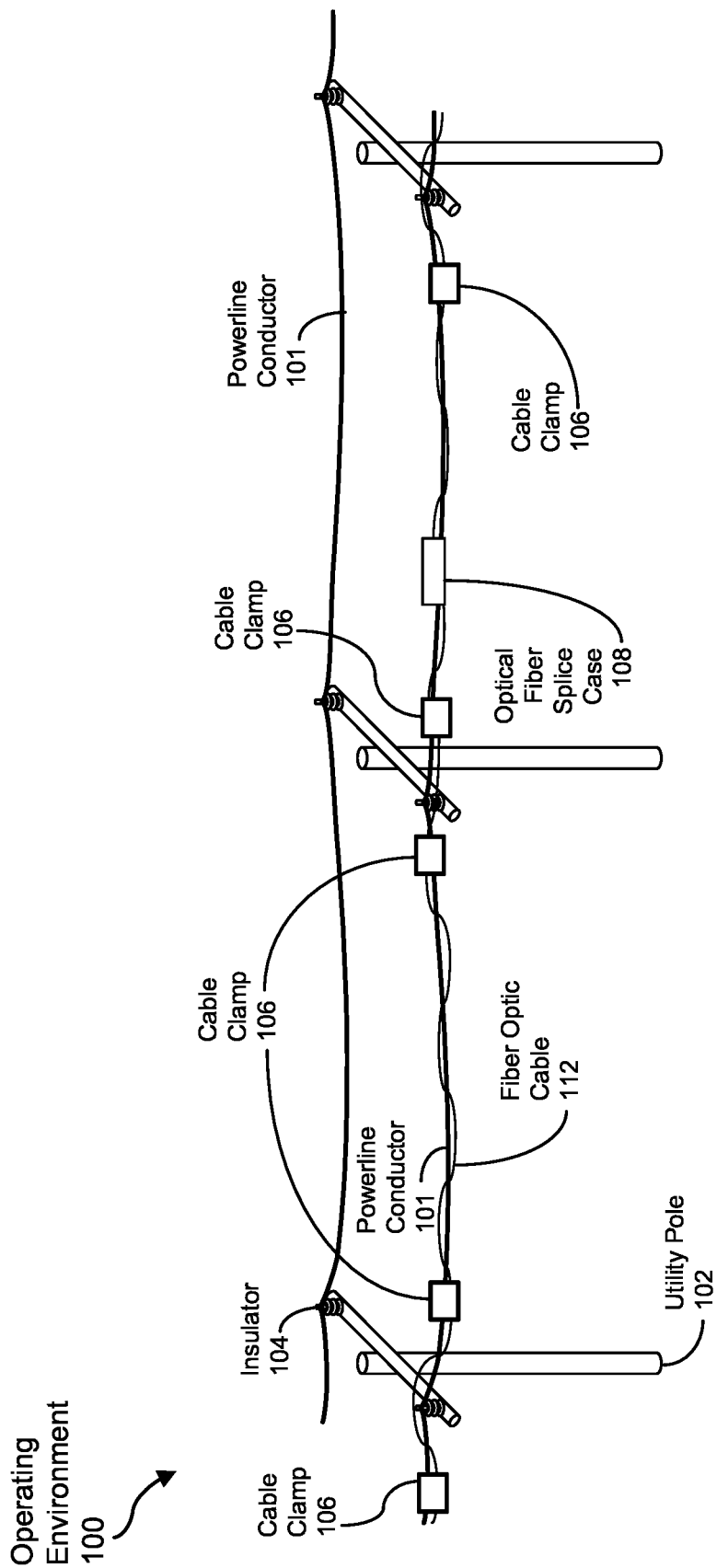
FIG. 1 is a graphical representation of an exemplary operating environment, including a powerline conductor, in which various exemplary embodiments may be employed.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Robotic devices may be employed to install fiber optic cable onto preexisting power infrastructure, such as powerline conductors for electrical power transmission and distribution lines, by way of helically wrapping the fiber optic cable about the powerline conductor. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline conductor (e.g., between towers or poles) while a rotation subsystem of the device helically wraps the fiber optic cable about the conductor.

Traditionally, the robotic device carries a segment of the fiber optic cable on a spool from which the cable is paid out as the cable is wrapped about the powerline conductor. Further, to facilitate the wrapping, the spool is typically mounted on a mechanical arm that rotates about the powerline conductor. Moreover, a counterweight is sometimes employed to balance the weight of the spool, thus contributing to the overall weight of the robotic system. In other examples, the segment of cable may be deployed as a "spool-free" fiber optic cable configuration or bundle for installation. In such examples, the cable may be wound in a circular or non-circular shape for placement in a tub or other container to be carried by the robotic device.

During or after such placement of fiber optic cable segments onto the powerline conductor, other tasks may be performed to complete the installation, as described in greater detail below. For example, corresponding optical fibers of consecutive segments of the cable may be fused or otherwise joined to form a long, continuous fiber optic cable communicatively connecting two communication points or nodes together. Additionally, a plurality of cable clamps may be installed along the powerline conductor to secure the fiber optic cable thereto.

Features from any of the embodiments described herein may be used in combination with one another in accordance with the general principles described herein. These and other embodiments, features, and advantages will be more fully understood upon reading the following detailed description in conjunction with the accompanying appendices.

Below, a brief description of an exemplary operating environment in which an exemplary robotic system for installing fiber optic cable may operate is provided in connection with FIG. 1. An exemplary robotic system for installing fiber optic cable is briefly discussed in conjunction with FIG. 2. Thereafter, embodiments of an exemplary fiber optic cable splice case and associated loading assembly are disclosed in conjunction with FIGS. 3-14, while exemplary methods of employing such a splice case to couple two fiber optic cable segments are explored in connection with FIG. 15. Further, in relation to FIGS. 16-25, embodiments of an exemplary clamp and associated accessory are described, and exemplary methods of installing such a clamp to retain the fiber optic cable at the powerline conductor is discussed in conjunction with FIG. 26.

FIG. 1 is a graphical representation of an exemplary operating environment 100 in which various embodiments disclosed herein may be utilized. As depicted in the example of FIG. 1, operating environment 100 may include an electrical power transmission or distribution system having a plurality of utility poles 102 carrying multiple powerline conductors 101. Examples of powerline conductors 101 may include stranded cables, but powerline conductors 101 are not restricted to such embodiments. While any number of powerline conductors 101 may be carried via utility poles 102, two powerline conductors 101 are illustrated in FIG. 1 for visual simplicity. In some examples, powerline conductors 101 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 101 may be included and covered in various embodiments of operating environment 100 discussed below. Additionally, powerline conductors 101 may include one or more phase conductors, ground wires, static wires, or other conductors supported by utility poles 102, towers, or the like.

Also shown in FIG. 1 is a fiber optic cable 112 aligned with, and mechanically coupled to, powerline conductor 101. In some embodiments, fiber optic cable 112 may be helically wrapped about powerline conductor 101, such as by way of a human-powered or electrically powered robotic device. However, other physical relationships between powerline conductor 101 and fiber optic cable 112 are also possible. While only one fiber optic cable 112 is depicted in FIG. 1, multiple powerline conductors 101 employing the same utility poles 102 may each have a corresponding fiber optic cable 112 attached or otherwise coupled thereto. As depicted in FIG. 1, fiber optic cable 112 may be secured to powerline conductor 101 via one or more cable clamps 106. In some examples, fiber optic cable 112 may follow a powerline conductor 101 associated with a particular phase of the power being transmitted, or fiber optic cable 112 may alternate between two or three different phases. Moreover, each fiber optic cable 112 may carry one or more optical fibers for facilitating communication within operating environment 100.

Additionally, FIG. 1 illustrates an optical fiber splice case 108 that, in some embodiments, splices together corresponding ends of optical fibers of fiber optic cable 112. For example, relatively long stretches (e.g., multiple-kilometer spans) of fiber optic cable 112 that may be coupled to powerline conductor 101 may be mechanically coupled together, thermally fused together, or otherwise coupled in optical fiber splice case 108, which may include optical couplers, amplifiers, and/or other components to facilitate transmission of optical data signals from one span of fiber optic cable 112 to the next. Additionally, in some embodiments, optical fiber splice case 108 may include wireless access points and other networking components (e.g., for communication with Internet of Things (IoT) devices, smart grid sensors (e.g., voltage sensors, current sensors, and the like), and user access networks). Moreover, optical fiber splice case 108 may include optical, electromagnetic, and other types of sensors to measure powerline conditions; environmental sensors for measuring temperature, humidity, and so on; video cameras for surveillance; and the like. To power such components, optical fiber splice case 108 may also include solar cells and/or batteries. In some examples, such as that shown in FIG. 1, optical fiber splice case 108 may be attached to, or positioned on or near, powerline conductor 101, as opposed to being mounted on a lower portion of utility pole 102, thus potentially eliminating the use of a phase-to-ground transition that otherwise may be coupled with each length of fiber optic cable 112 to provide electrical isolation from powerline conductor 101.

Figure 2:
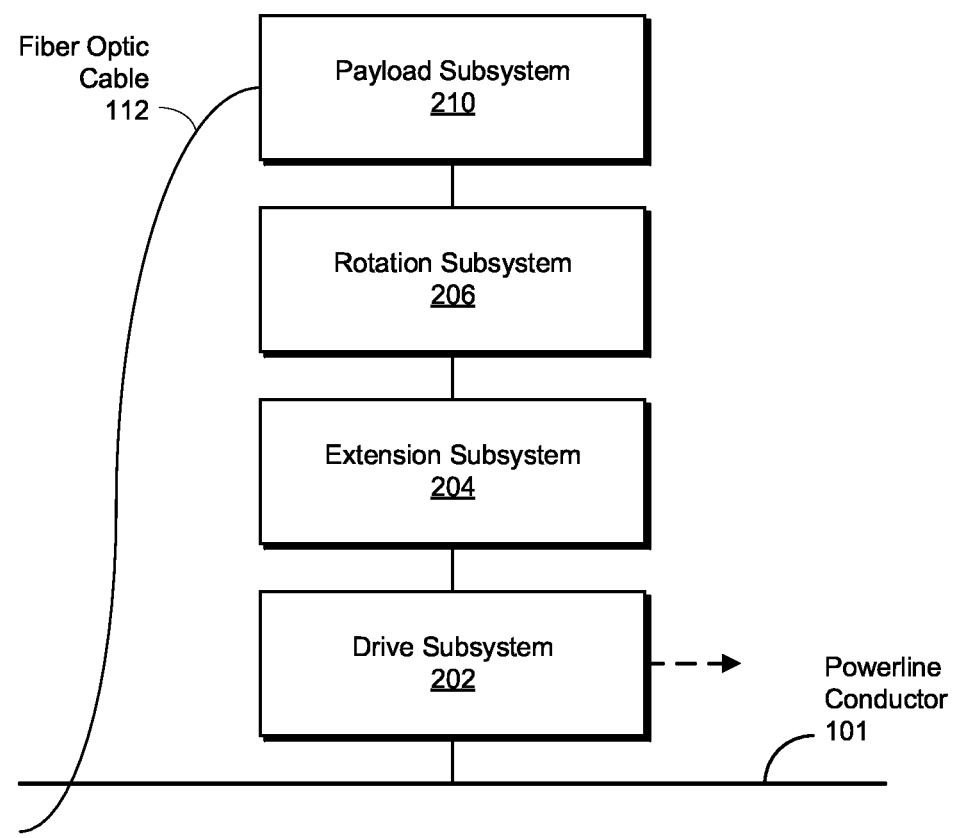
FIG. 2 is a block diagram of an exemplary robotic system that may install a segment of fiber optic cable onto a powerline conductor.

FIG. 2 is a block diagram of an exemplary robotic system 200 for installing fiber optic cable (e.g., fiber optic cable 112) onto a powerline conductor (e.g., powerline conductor 101). As depicted in FIG. 2, robotic system 200 may include a drive subsystem 202, an extension subsystem 204, a rotation subsystem 206, and/or a payload subsystem 210. In some embodiments, FIG. 2 provides a general representation of how subsystems 202-210 are mechanically coupled to each other, although other examples may possess alternative connection arrangements. In some embodiments, drive subsystem 202 may translate along powerline conductor 101. Also, in some examples, extension subsystem 204 may mechanically couple rotation subsystem 206 to drive subsystem 202 and selectively extend rotation subsystem 206, along with payload subsystem 210, away from drive subsystem 202 and/or powerline conductor 101 to avoid obstacles (e.g., insulators 104) along powerline conductor 101. Rotation subsystem 206, in some examples, may rotate payload subsystem 210, which may in turn carry a segment of fiber optic cable 112, about powerline conductor 101 while drive subsystem 202 translates along powerline conductor 101 such that the segment of fiber optic cable 112 is wrapped helically about powerline conductor 101.

Moreover, in some embodiments, rotation subsystem 206 may include one or more stabilization components (e.g., one or more thrusters) that may help attain or maintain a desired position of rotation subsystem 206 and/or other portions of robotic system 200 relative to powerline conductor 101, such as directly above powerline conductor 101. Further, in some examples, the stabilization components may be employed at least during times when extension subsystem 204 is extending rotation subsystem 206 (and, consequently, payload subsystem 210) away from powerline conductor 101.

Embodiments of exemplary fiber optic cable splice cases (e.g., optical fiber splice case 108), as described below, may be employed to splice together ends of consecutive segments of fiber optic cable (e.g., fiber optic cable 112) at a location removed from the powerline conductor (e.g., powerline conductor 101) upon which the fiber optic cable is being installed, after which the splice case may be moved and attached to the powerline conductor while facilitating the taking up of slack in the fiber optic cable segments that may result from moving the splice case to the powerline conductor. Further, embodiments of exemplary cable clamps (e.g., cable clamp 106), as described below, may be installed at various positions to secure the fiber optic cable onto the powerline conductor while reducing the possibility of inflicting structural damage to the fiber optic cable.

Figure 3:
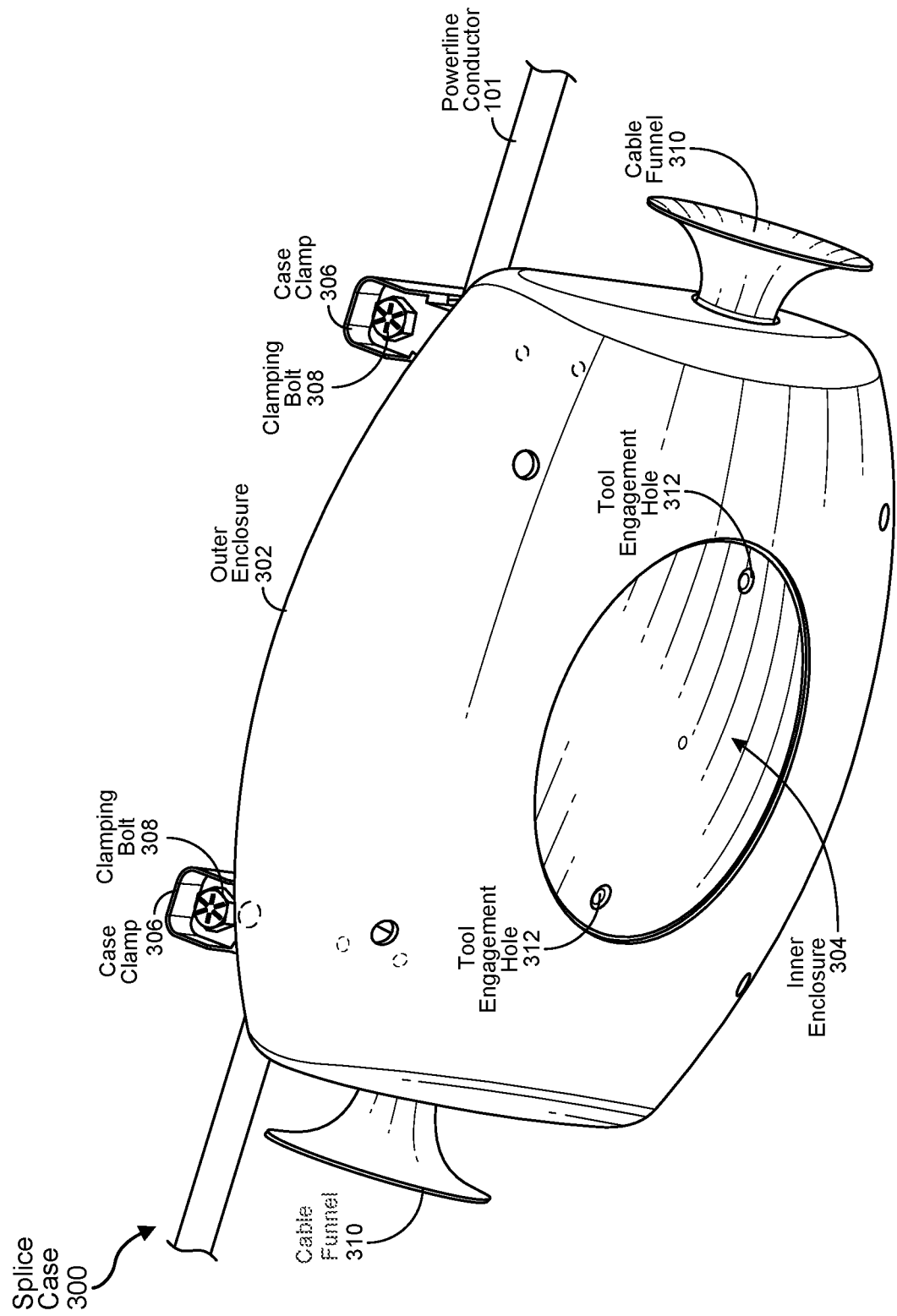
FIG. 3 is a lower perspective view of an exemplary fiber optic cable splice case employable in the operating environment of FIG. 1.
Figure 4:
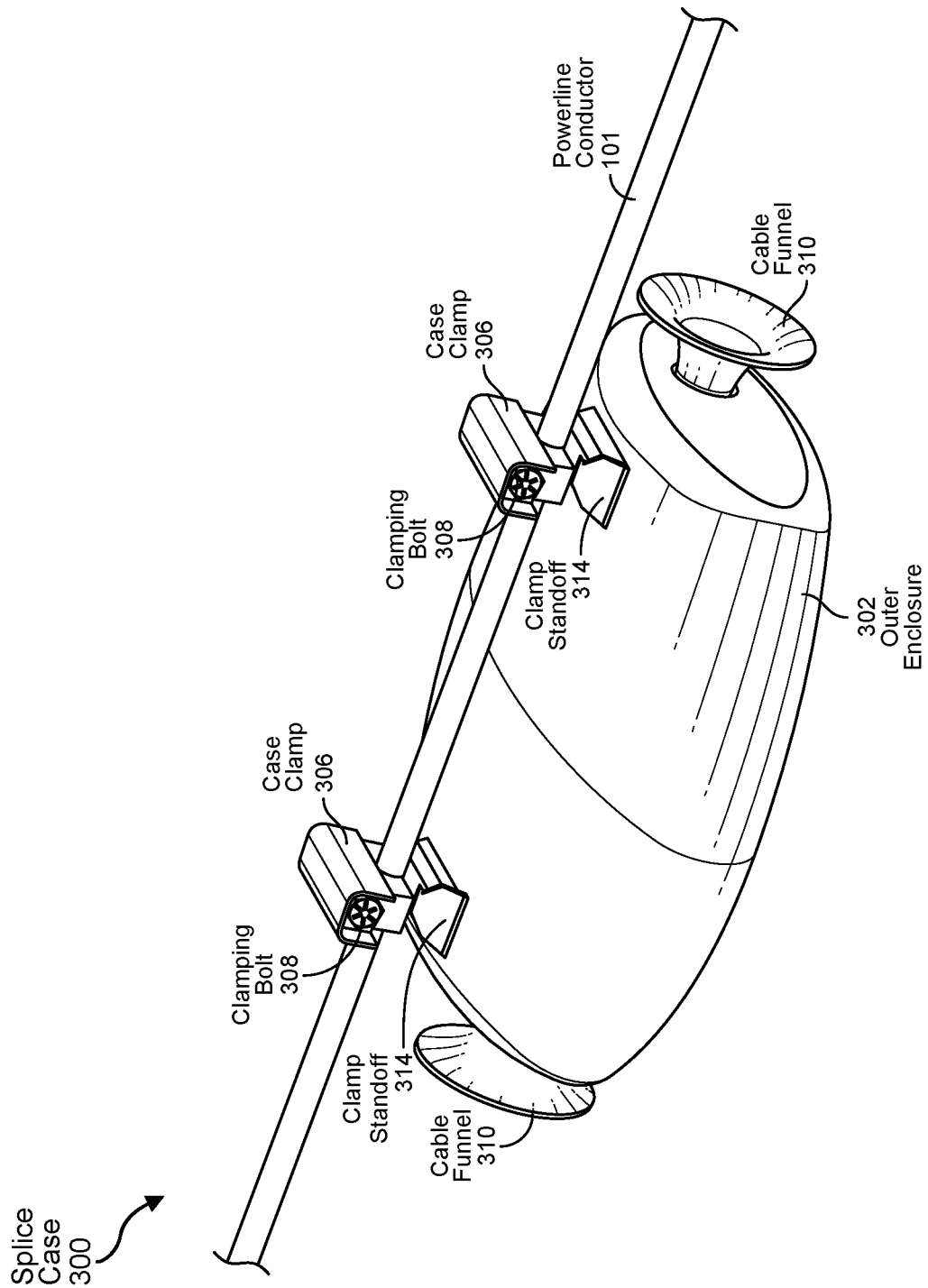
FIG. 4 is an upper perspective view of the exemplary splice case of FIG. 3.
Figure 5:
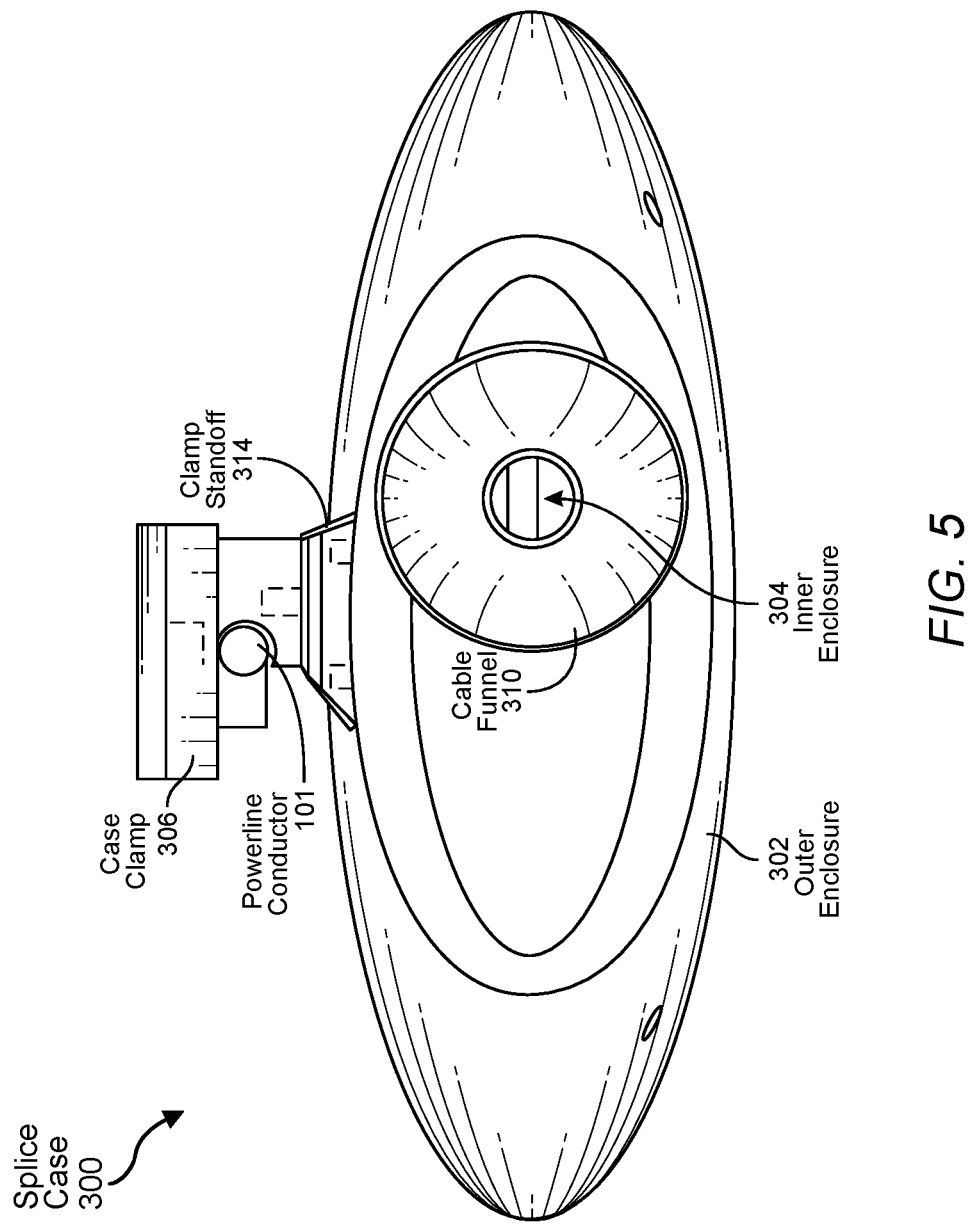
FIG. 5 is an end view of the exemplary splice case of FIG. 3.

FIGS. 3-11 are various views of an exemplary fiber optic cable splice case 300 and portions thereof. To begin, FIGS. 3, 4, and 5 are lower perspective, upper perspective, and end views, respectively, of splice case 300, which is shown attached to powerline conductor 101. More specifically, splice case 300 may include an outer enclosure 302 that is attached to powerline conductor 101 by way of two case clamps 306 that are actuated by corresponding clamping bolts 308. As seen in FIGS. 4 and 5, a clamp standoff 314 may couple each case clamp 306 to outer enclosure 302. In some examples, to facilitate the use of metal for case clamp 306 for attachment to a line potential at powerline conductor 101, clamp standoff 314 may be constructed of a tracking resistant insulator (e.g., nonmetallic) material to provide a high degree of electrical isolation between powerline conductor 101 and outer enclosure 302. (As used herein, the term "tracking" may generally refer to the electrical or dielectric breakdown of an insulating material that may occur in the presence of high voltage, particularly in an outdoor (e.g., high humidity) environment.) Additionally, clamp standoff 314 may operate as a thermal buffer to isolate outer enclosure 302 and the remainder of splice case 300 from heat generated in powerline conductor 101. Additionally, in at least some embodiments, outer enclosure 302 may also be constructed of a tracking resistant and/or heat resistant insulating material.

Further, a clamping bolt 308 (e.g., a ferromagnetic bolt), when appropriately tightened, may cause case clamp 306 to securely grip powerline conductor 101, as depicted in FIGS. 3-5. In some embodiments, to facilitate the tightening of clamping bolt 308 safely from some distance away (e.g., a few feet) from powerline conductor 101, a socket head (not shown in the drawings) attached to a distal end of a hot stick may be used. (As used herein, a "hot stick" may generally refer to a pole made of a light, strong insulating material (e.g., fiberglass) to which various types of tools or accessories may be attached to a distal end thereof to facilitate the performance of tasks by a utility worker in close proximity to a high-voltage powerline conductor.) In some examples, such a socket head may possess a deep profile with an embedded magnet at or near the base of the socket head. Consequently, in some examples, when the socket head is employed to tighten clamping bolt 308, the magnet may provide a magnet force such that when clamping bolt 308 is in a loosened position, the head of clamping bolt 308 may be located close to the magnet, thus maximizing the magnetic force imposed on clamping bolt 308. In some examples, such force may be sufficient to support an entirety of splice case 300 via the hot stick. Further, as clamping bolt 308 is tightened, the distance between the head of clamping bolt 308 and the magnet in the socket head may progressively increase. Accordingly, at or near the point clamping bolt 308 is fully tightened at case clamp 306, the magnetic force upon clamping bolt 308 may be reduced such that the hot stick may be used to easily withdraw the socket head from clamping bolt 308.

Figure 11:
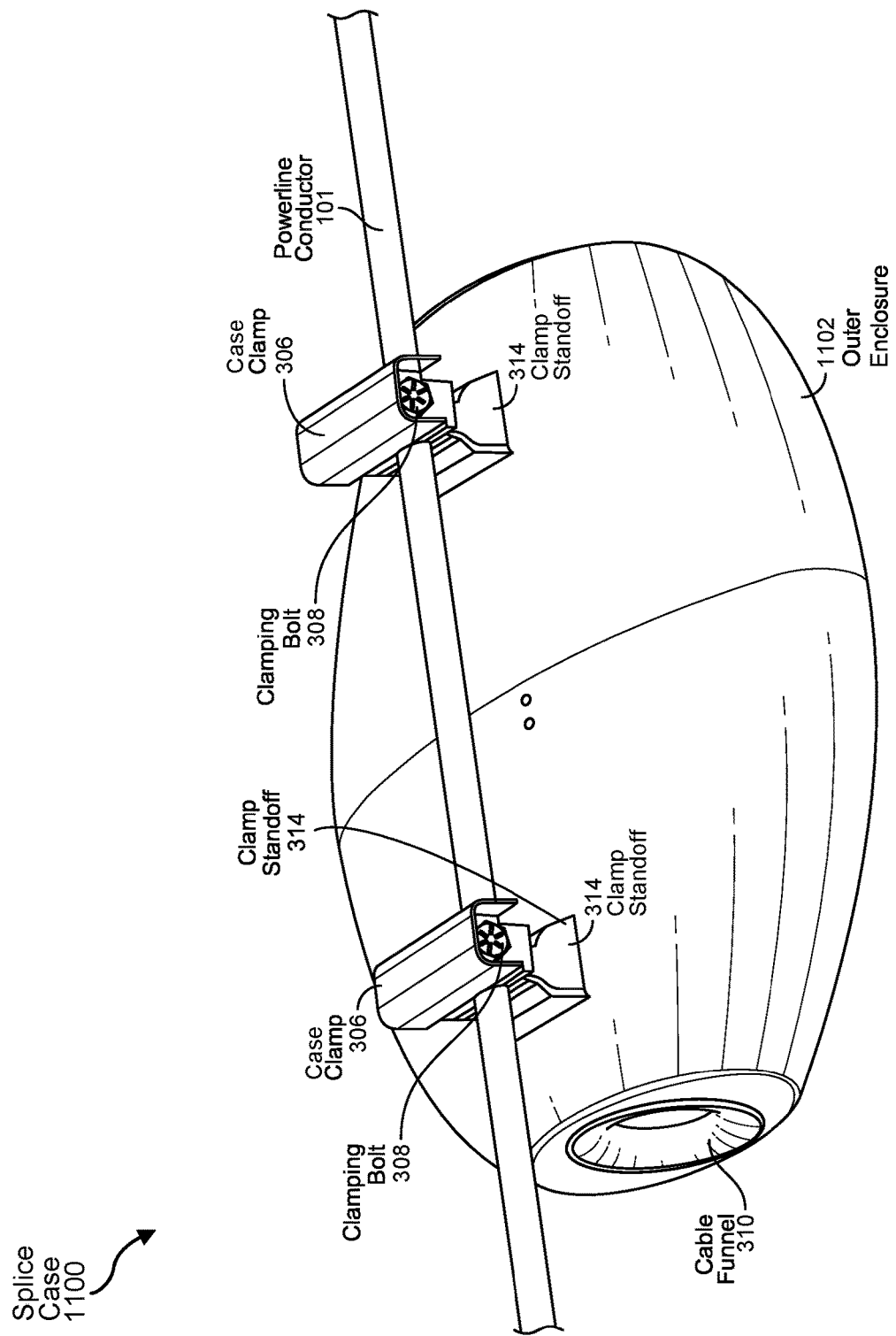
FIG. 11 is a perspective view of another exemplary fiber optic cable splice case.

Also shown in FIGS. 3-5 are a plurality of cable funnels 310 (e.g., coupled to opposing ends of outer enclosure 302), each of which may define a path between an exterior and an interior of outer enclosure 302. As depicted, two cable funnels 310 may be positioned at opposing ends of outer enclosure 302, although other numbers of cable funnels 310 may be used in other examples. In such cases, each cable funnel 310 may accept at least one corresponding segment of fiber optic cable 112 such that the two segments entering outer enclosure 302 through corresponding cable funnels 310 may be joined within splice case 300. In addition, as shown in FIGS. 3 and 4, the opposing ends of outer enclosure 302 may be aligned along powerline conductor 101 when splice case 300 is attached thereto. Further, in some examples, cable funnels 310 may be offset on either side of a centerline of splice case 300 aligned parallel to powerline conductor 101. As described in greater detail below, such an offset may facilitate retraction into outer enclosure 302 of an excess amount of the segments of fiber optic cable 112. In some examples, cable funnels 310 may be shaped such that the segments of fiber optic cable 112 may not be bent beyond a minimum bend radius for fiber optic cable 112 that may otherwise inflict damage thereon. While cable funnels 310 are illustrated as extending externally beyond the opposing ends of splice case 300, in other embodiments, cable funnels 310 be reside substantially completely within an extended outer enclosure 1102, as depicted in FIG. 11.

Further with respect to FIGS. 3-5, splice case 300 may include an inner enclosure 304 that is located in its entirely within outer enclosure 302. In other examples not described herein, inner enclosure 304 may at least partially extend beyond (e.g., below) outer enclosure 302. Also, inner enclosure 304 may be rotatably coupled to outer enclosure 302 (e.g., about a vertical rotational axis or hub substantially centered on inner enclosure 304. Moreover, as depicted herein, inner enclosure 304 may exhibit a substantially cylindrical shape that defines the rotational axis about which inner enclosure 304 may rotate relative to outer enclosure 302. As described in greater detail below, this rotation may be employed to take up slack in the segments of fiber optic cable 112 into outer enclosure 302 via cable funnels 310.

In some embodiments, a bottom surface of inner enclosure 304 may define a pair of tool engagement holes 312 diametrically opposite each other across the rotational axis of inner enclosure 304. As is discussed more fully below, an external tool may engage tool engagement holes 312 to rotate inner enclosure 304 relative to outer enclosure 302. Also, in some examples, more than one pair of tool engagement holes 312 may be defined by inner enclosure 304 to provide multiple locations at varying angles about the rotational axis of inner enclosure 304 by which the external tool may engage with inner enclosure 304. In other embodiments, a component of splice case 300 (e.g., internal to outer enclosure 302), such as a spring-loaded mechanism, may provide the mechanical force to rotate inner enclosure 304.

Figure 6:
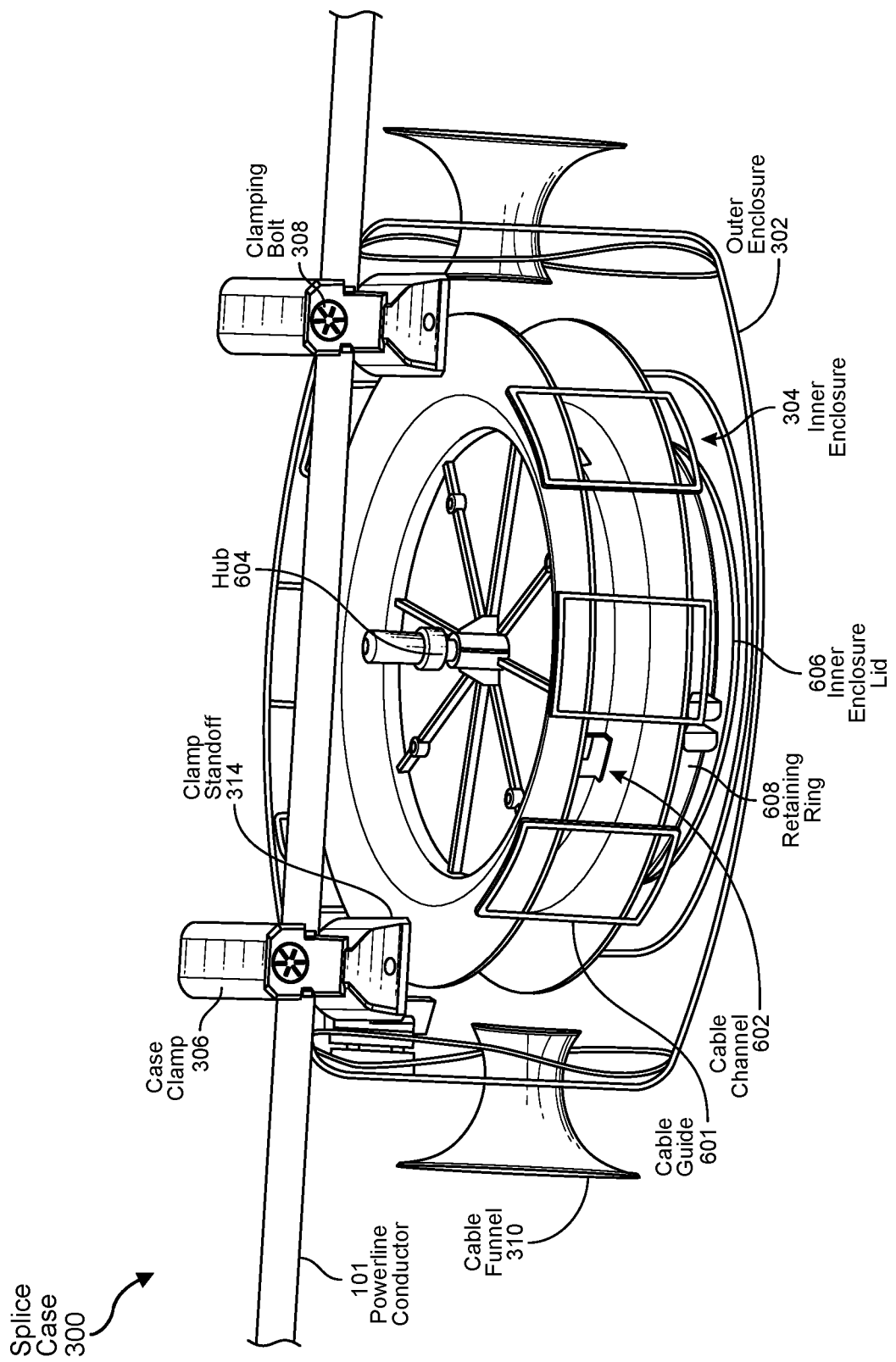
FIG. 6 is an upper perspective view of the exemplary splice case of FIG. 3, highlighting an inner enclosure of the splice case.
Figure 7:
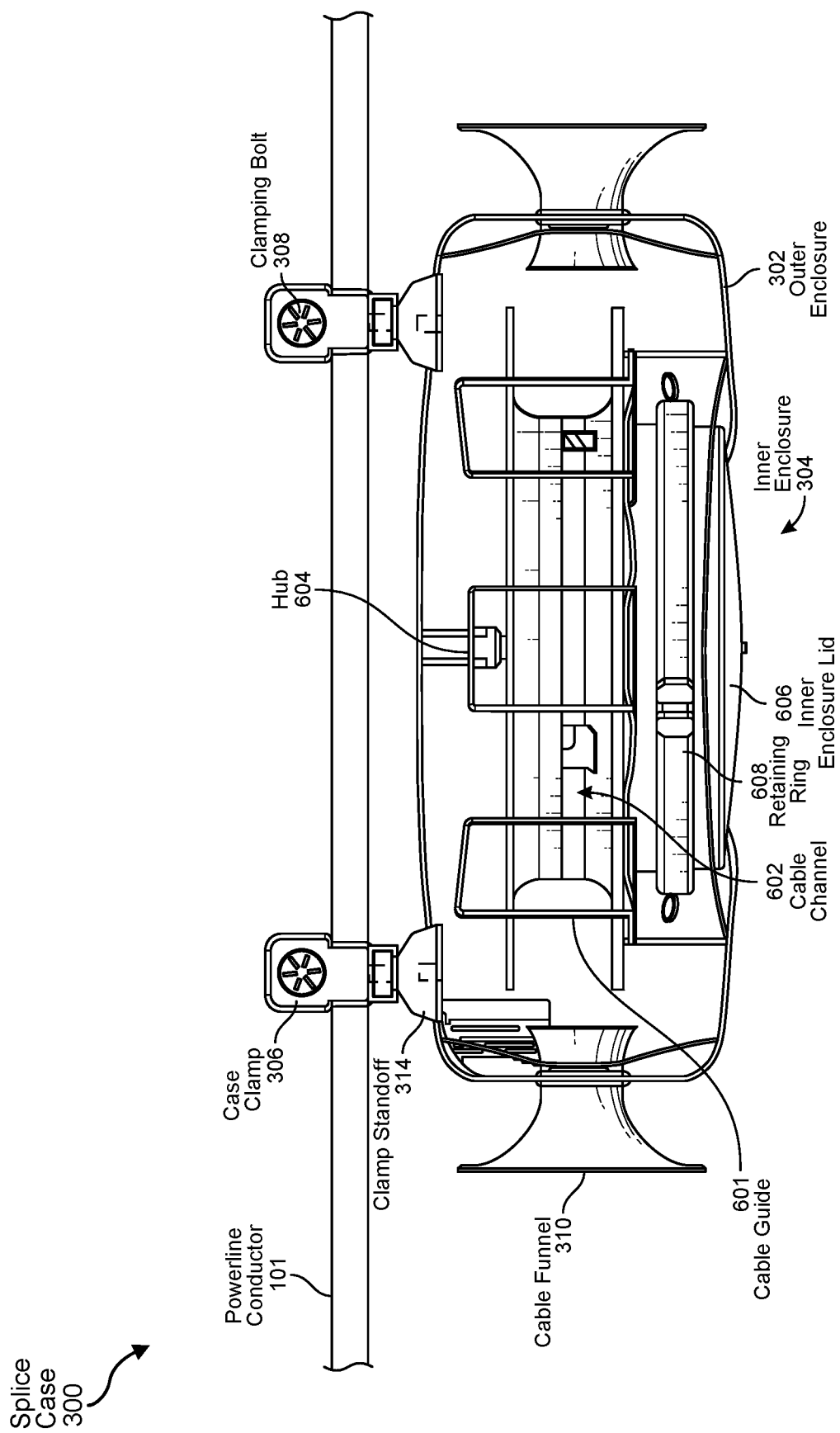
FIG. 7 is a side view of the exemplary splice case of FIG. 3, highlighting the inner enclosure of the splice case.
Figure 8:
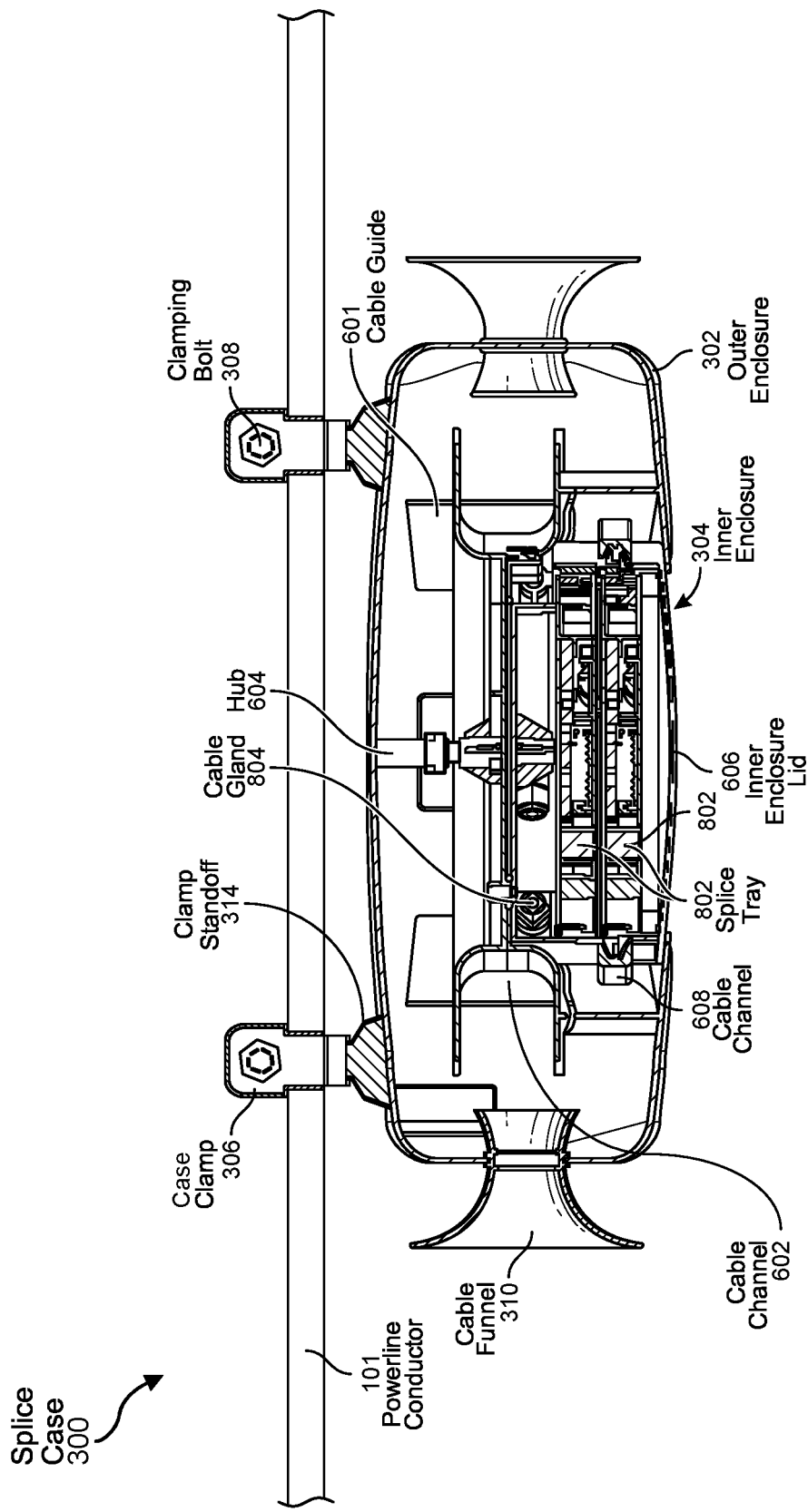
FIG. 8 is a side cross-sectional view of the exemplary splice case of FIG. 3.
Figure 9:
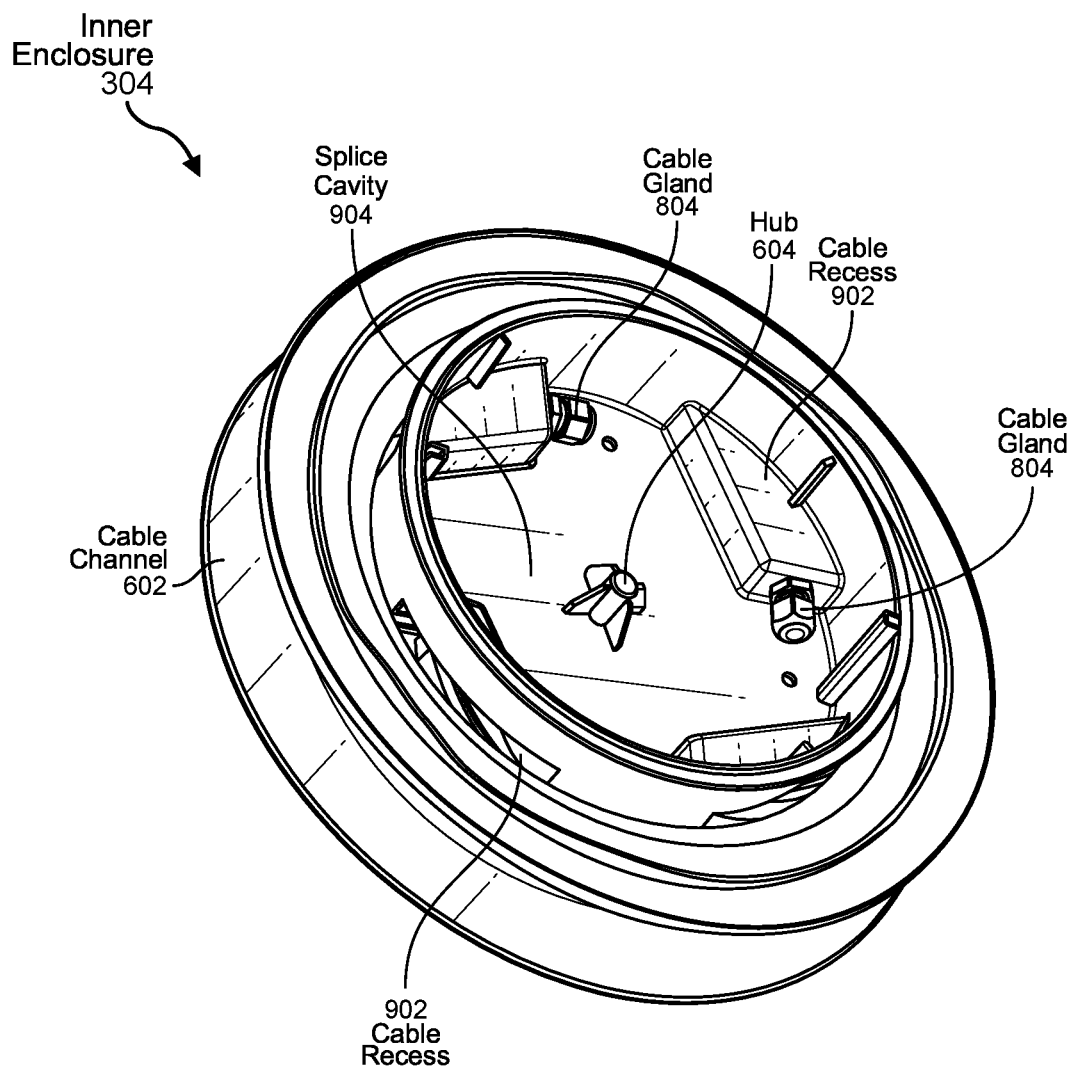
FIG. 9 is perspective view of the inner enclosure of the exemplary splice case of FIG. 3.
Figure 10:
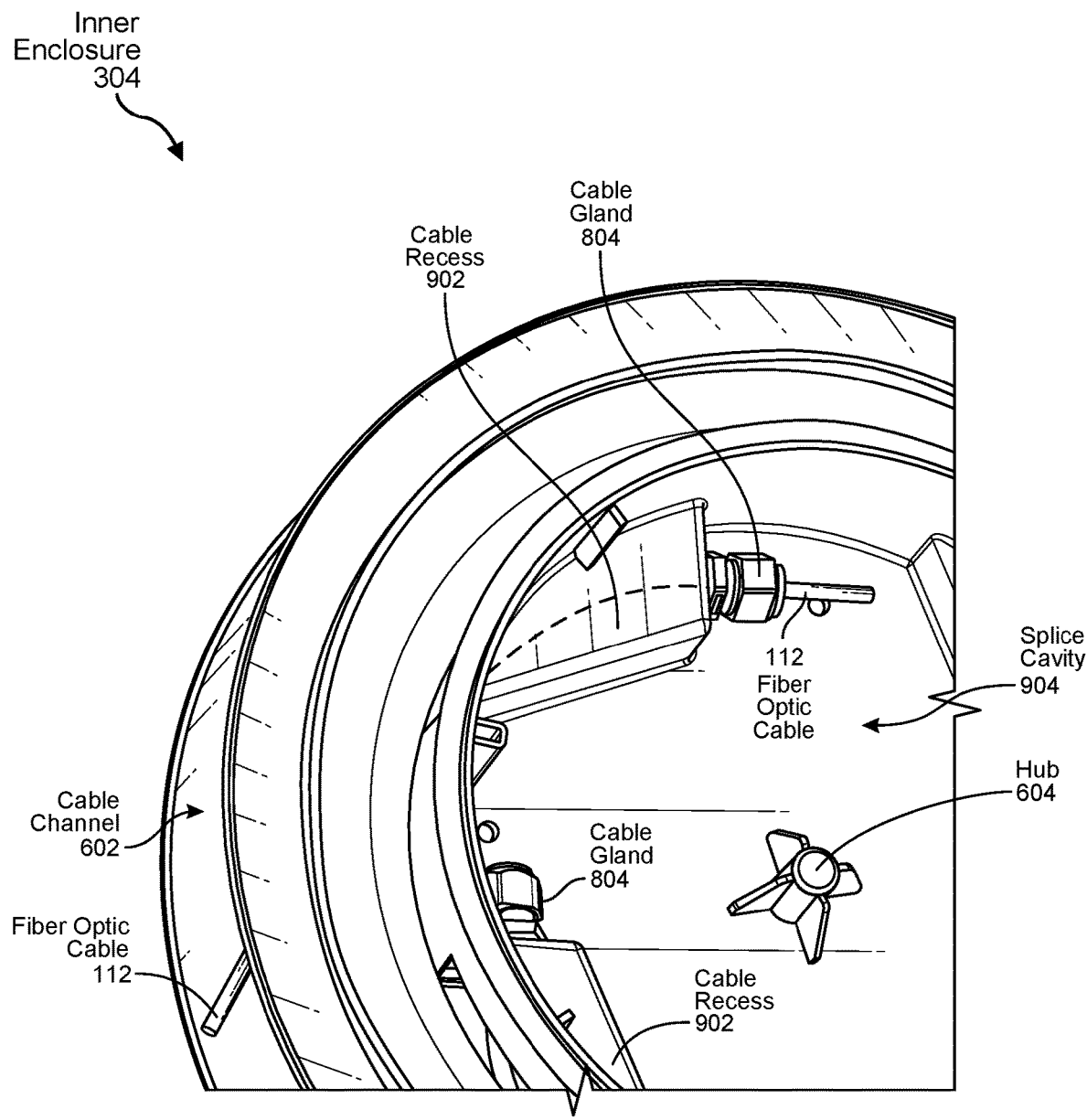
FIG. 10 is a partial perspective view of the inner enclosure of the exemplary splice case of FIG. 3, depicting a fiber optic cable 112 installed therein.

FIGS. 6 and 7 provide upper perspective and side views, respectively, of inner enclosure 304, while depicting outer enclosure 302 in outline or "wireframe" form. Further, FIG. 8 is a cross-sectional view of splice case 300 displaying several details of inner enclosure 304. In addition, FIGS. 9 and 10 are perspective and partial perspective views, respectively, of inner enclosure 304 in isolation. As seen in FIGS.

6-8, inner enclosure 304 may define a cable channel 602 about an exterior (e.g., about a circumference of a cylindrical surface) of inner enclosure 304. Cable channel 602, in some examples, may resemble a spool with flanges that form a U-shape cross-section for cable channel 602 in which a retracted portion of the segments of fiber optic cable 112 being joined may be stored by way of the rotation of inner enclosure 304. In addition, FIGS. 6 and 7 depict a hub 604 that rotatably couples inner enclosure 304 to outer enclosure 302.

As shown in FIGS. 9 and 10, inner enclosure 304 may also define a splice cavity 904 within which the joined ends of the segments of fiber optic cable 112 may be stored. In some embodiments, as depicted in FIG. 8, one or more splice trays 802 that couple ends of corresponding optical fibers of the segments of fiber optic cable 112 may be stored and secured within splice cavity 904. In some examples, a single splice tray 802 may be used that holds 24 splices for joining 24 optical fibers from two fiber optic cable 112 segments (one per cable funnel 310), while in other examples, two splice trays 802 may be located within splice cavity 904 (e.g., in a stacked configuration, as shown in FIG. 8), with each splice tray 802 joining two separate pairs of fiber optic cable 112 segments, for a total 48 splices and four fiber optical cable 112 segments (two per cable funnel 310).

To provide a weatherproof enclosure for the optical fiber splices, inner enclosure 304 may include an inner enclosure lid 606 that covers a bottom opening of splice cavity 904. In some embodiments, inner enclosure lid 606 may define tool engagement holes 312, described above. In some examples, inner enclosure lid 606 may include a weather-sealing lip that mates with the bottom opening of inner enclosure 304. Moreover, in some embodiments, inner enclosure lid 606 may be secured to inner enclosure 304 using a retaining ring 608.

To facilitate transition of each segment of fiber optic cable 112 from cable channel 602 into splice cavity 904, an end of the segment may be fed through a hole in cable channel 602 (shown, for example, in FIG. 7) into a cable recess 902 of inner enclosure 304 before entering into splice cavity 904 via a cable gland 804 (e.g., as depicted to best effect in FIGS. 9 and 10). Cable gland 804, in at least some examples, may be a strain relief device for attaching electrical or optical cables to bulkheads or plates that provide a hole through which the cable is to extend. As shown in FIG. 10, the arrangement of cable recess 902 and cable gland 804 relative to cable channel 602 may facilitate routing of the associated segment fiber optic cable 112 segment into splice cavity 904 without violating a minimum bend radius of fiber optic cable 112.

In view of the structure of splice case 300, as described above, rotation of inner enclosure 304 relative to outer enclosure 302 (e.g., clockwise from the point of view of FIGS. 9 and 10) would result in the retraction of all segments (e.g., two or four segments) of fiber optic cable 112 by drawing the segments into outer enclosure 302 through cable funnels 310 while wrapping the segments onto inner enclosure 304 at cable channel 602.

Figure 12:
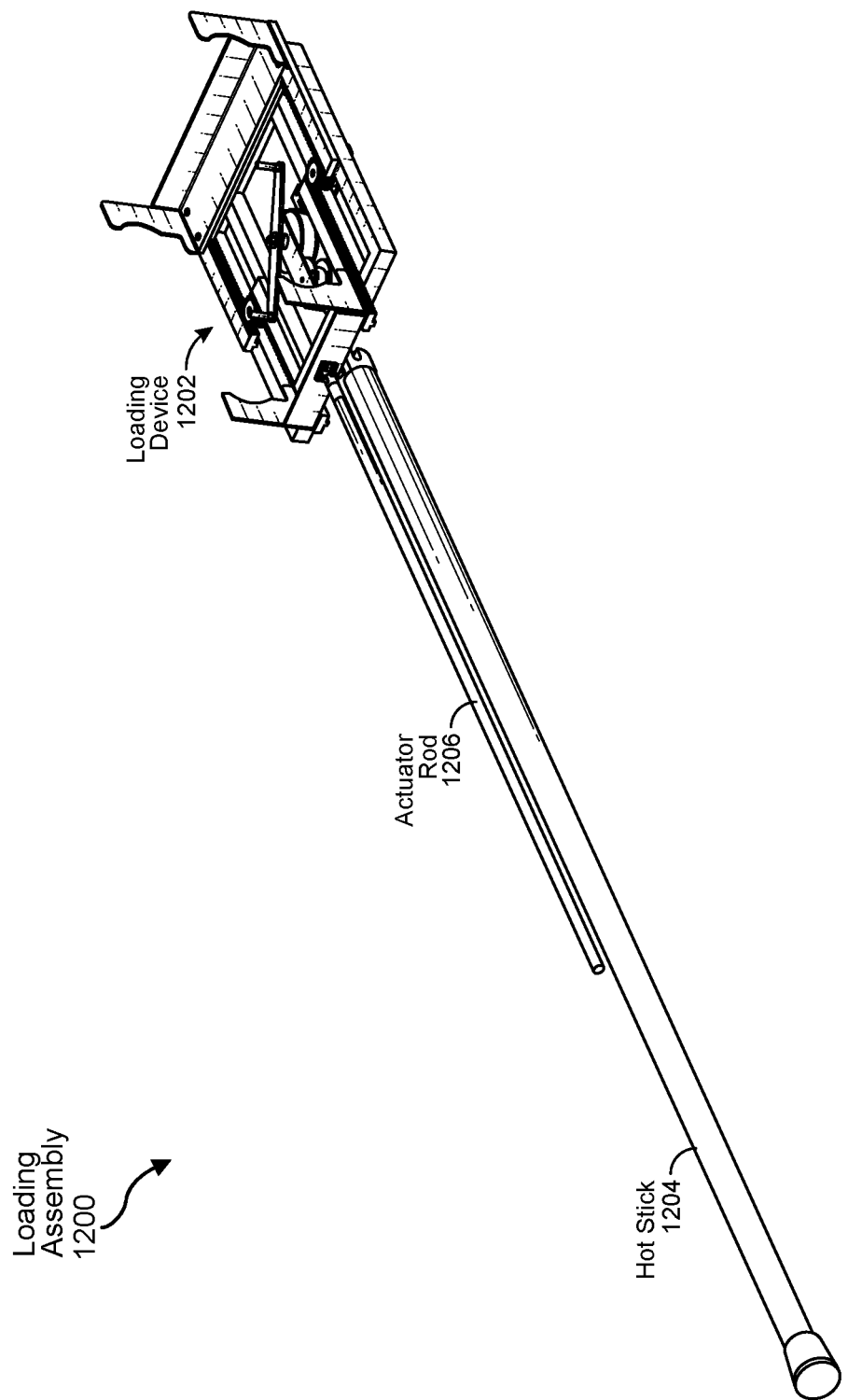
FIG. 12 is a perspective view of an exemplary loading assembly including an exemplary loading device employable for installing a fiber optic cable splice case on a powerline conductor.
Figure 13:
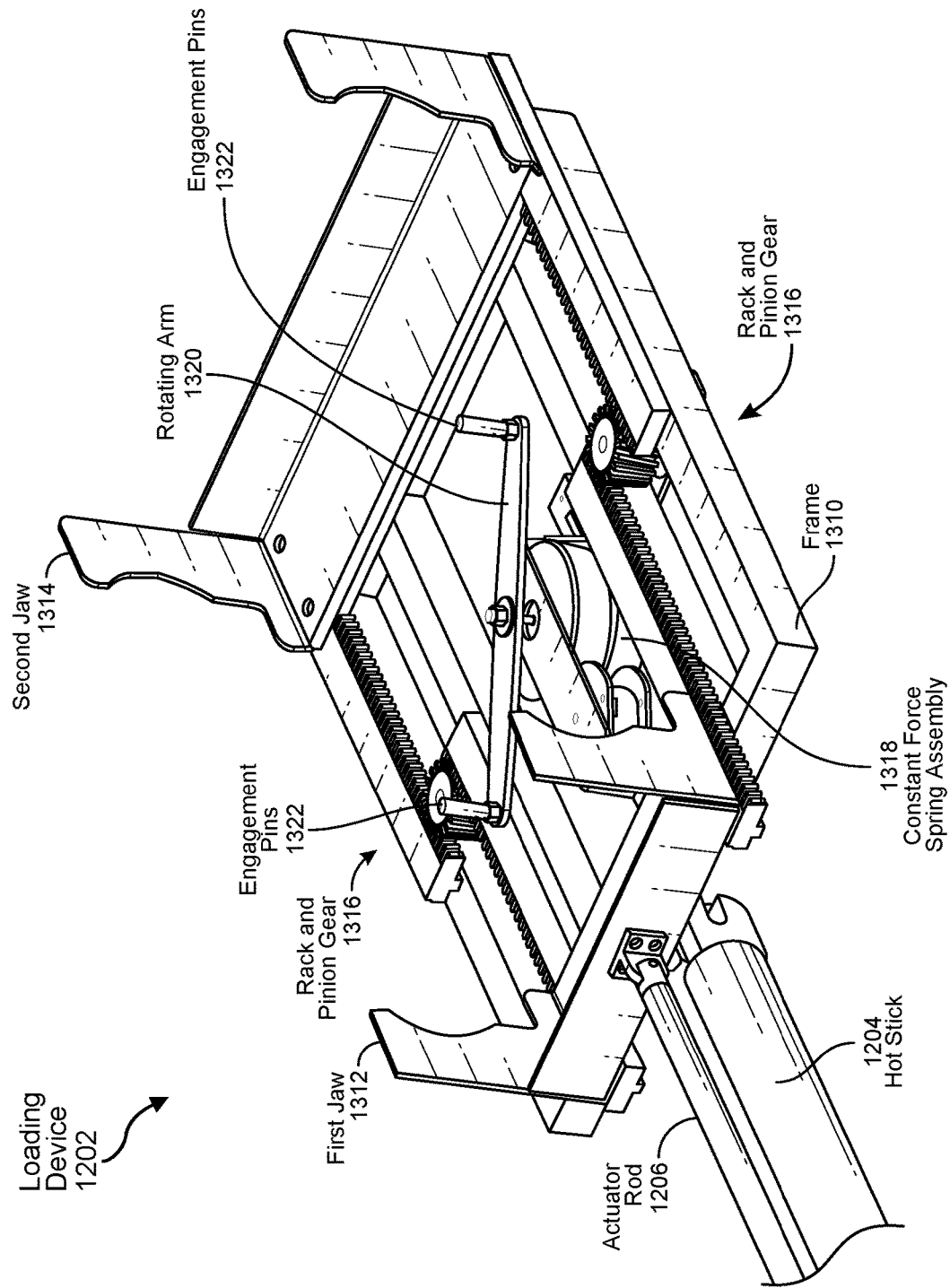
FIG. 13 is a perspective view of the exemplary loading device of FIG. 12.
Figure 14:
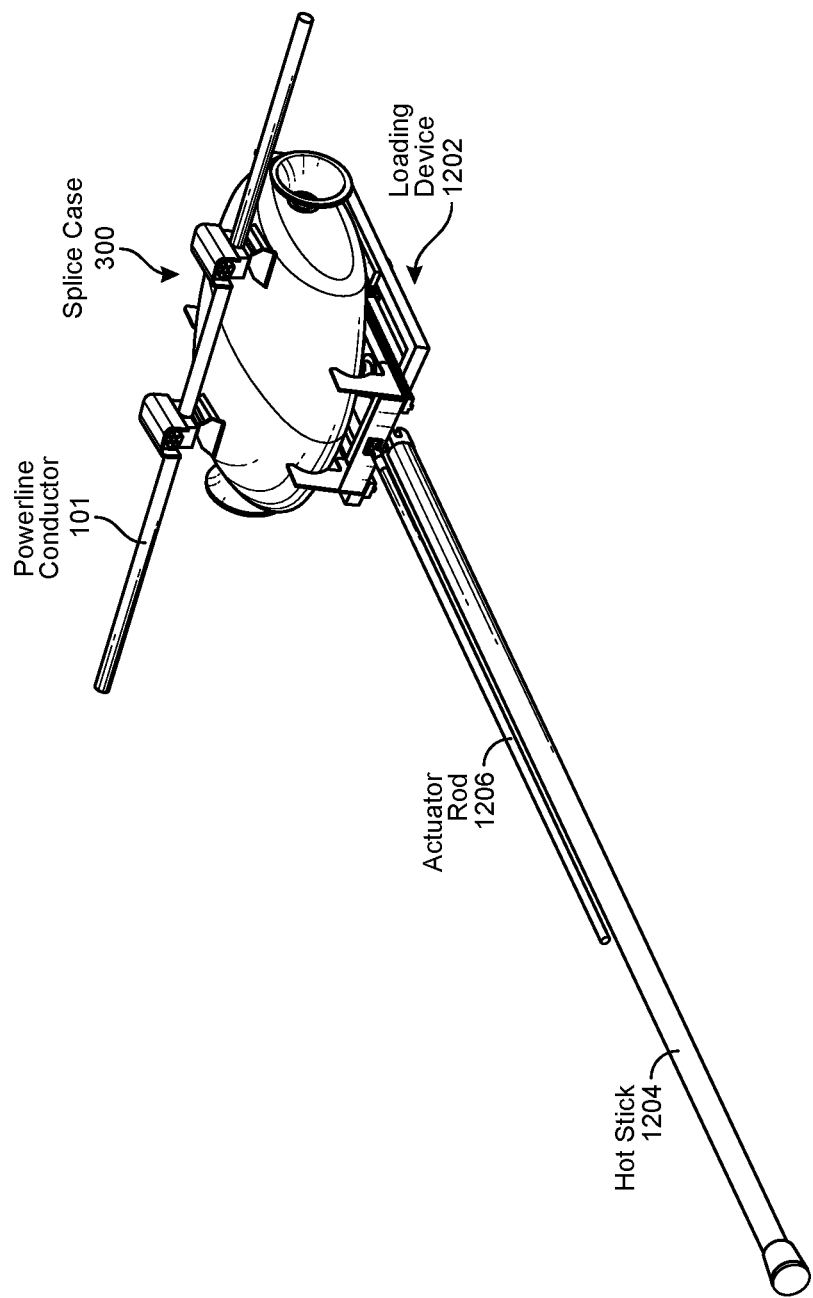
FIG. 14 is a perspective view of the exemplary loading assembly of FIG. 12 during installation of a fiber optic cable splice case onto a powerline conductor.

In some examples, after the ends of the segments of fiber optic cable 112 are joined and secured within inner enclosure 304 (e.g., at or near ground level), an installer or operator may employ a tool in the form of a loading assembly to position splice case 300 at powerline conductor 101. FIGS. 12-14 provide various views of such a loading assembly 1200 that may include a loading device 1202 that interfaces with splice case 300, an actuator rod 1206 (e.g., constructed from a insulating material) for operating loading device 1202, and a hot stick 1204 that may support splice case 300 during installation. More specifically, FIG. 12 is a perspective view of loading assembly 1200, FIG. 13 is a perspective view of loading device 1202, and FIG. 14 is a perspective view of loading assembly 1200 during an installation or loading of splice case 300 onto powerline conductor 101.

As shown to best effect in FIG. 13, loading device 1202 may include a frame 1310 upon which two rack and pinion gears 1316 are mounted. As illustrated, each rack and pinion gear 1316 may use a dual rack arrangement in which the pinion is rotatably coupled to frame 1310 and the associated racks may be translated synchronously via the pinion together or apart relative to frame 1310. Further, one rack of each rack and pinion gear 1316 may be connected to a first jaw 1312, while the other rack of each rack and pinion gear 1316 may be connected to a second jaw 1314 such that first jaw 1312 and second jaw 1314 selectively engage with, or disengage from, splice case 300. For example, to control the position of first jaw 1312 and second jaw 1314, an operator may maneuver actuator rod 1206, shown attached to first jaw 1312 in FIG. 13, while maintaining frame 1310 steady via hot stick 1204, to urge first jaw 1312 and second jaw 1314 together or apart. In yet other embodiments, other mechanical subsystems (e.g., bar linkages) may be employed in lieu of rack and pinion gears 1316 to couple first jaw 1312 and second jaw 1314 together as described above.

Also included in loading device 1202 may be a constant force spring assembly 1318 coupled to frame 1310 and to a rotating arm 1320 having a pair of diametrically opposed engagement pins 1322. In at least some embodiments, engagement pins 1322 may be configured to engage tool engagement holes 312 of inner enclosure 304 (shown in FIG. 3) to rotate inner enclosure 304 using constant force spring assembly 1328. To facilitate this engagement, a center or hub of rotating arm 1320 that is coupled with constant force spring assembly 1328 may be centered directly between the pinions of rack and pinion gears 1316 so that engagement pins 1322 will align correctly with tool engagement holes 312 when rotating arm 1320 is oriented appropriately. In some examples, prior to engaging splice case 300 with loading device 1202, the operator may preload mechanical energy into constant force spring assembly 1318 such that when the energy is released after splice case 300 is engaged by loading device 1202 (e.g., as shown in FIG. 14), rotating arm 1320 may rotate inner enclosure 304 to take up slack in the segments of fiber optic cable 112 joined within splice case 300. In some embodiments, a latch or other mechanism not explicitly shown in FIGS. 12-14 may prevent the release of energy from constant force spring assembly 1318 until rotation of inner enclosure 304 is desired.

In some embodiments, loading assembly 1200 may also be utilized to carry splice case 300 from an installed position to another position (e.g., removed and lowered from powerline conductor 101) to perform repair or replacement operations on one or more components of splice case 300 or fiber optic cable 112. For example, loading assembly 1200 may be engaged with splice case 300 by way of first jaw 1312 and second jaw 1314 of loading device 1202 while case clamps 306 are loosened. Hot stick 1204 may then be used to lower splice case 300 away from powerline conductor 101 while allowing the portions of fiber optic cable 112 wrapped about inner enclosure 304 to be extracted via cable funnels 310 as inner enclosure 304 rotates. In some embodiments, loading device 1202 may be configured such that mechanical energy may be stored in constant force spring assembly 1318 due to the rotation of inner enclosure 304 as splice case 300 is lowered such that constant force spring assembly 1318 may store a sufficient amount of energy after the repair or replacement operation to raise splice case 300 toward powerline conductor 101 once more prior to reattachment thereto.

Figure 15:
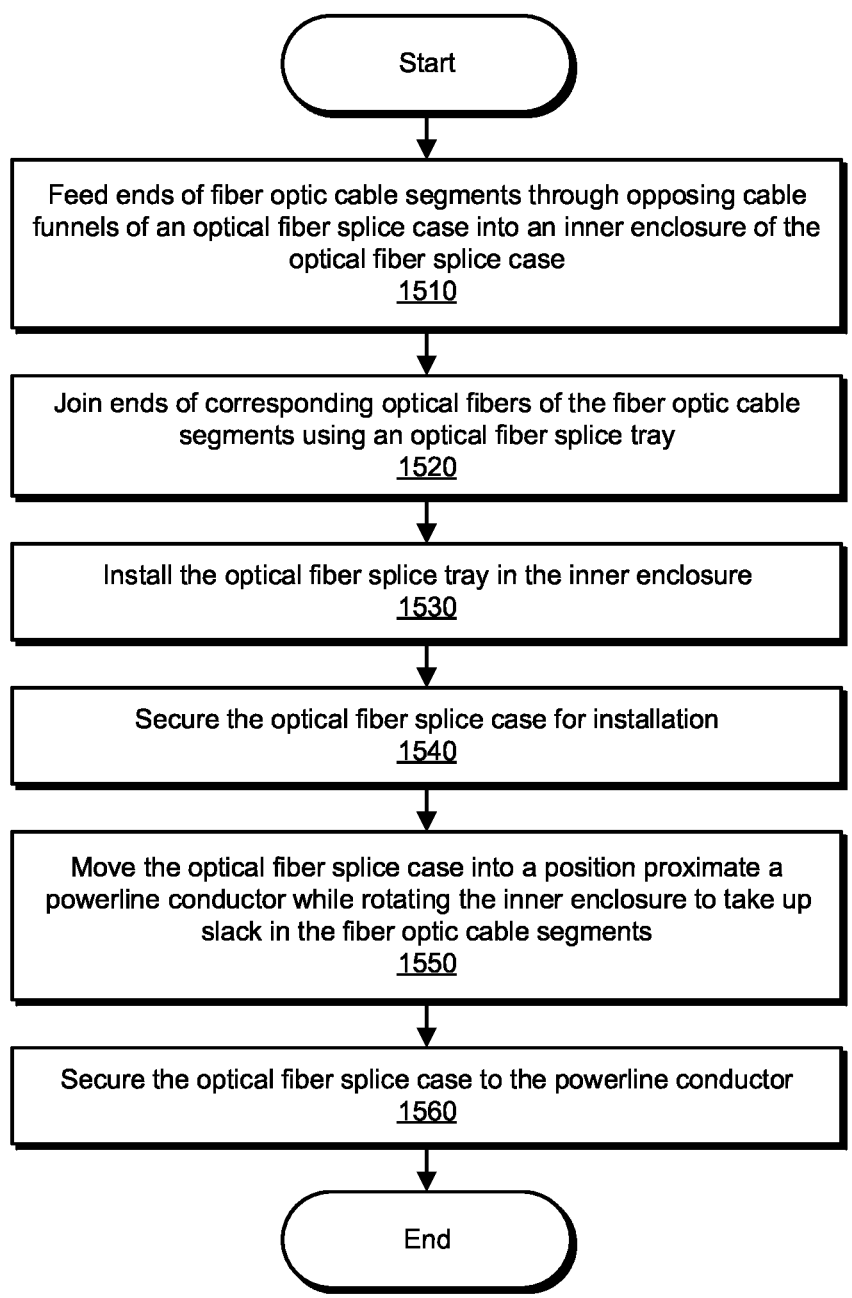
FIG. 15 is a flow diagram of an exemplary method for employing and installing a fiber optic cable splice case onto a powerline conductor.

FIG. 15 is a flow diagram of an exemplary method 1500 for employing and installing a fiber optic cable splice case (e.g., splice case 300) onto a powerline conductor (e.g., powerline conductor 101). While method 1500 is described as employing splice case 300 and loading assembly 1200, other splice cases and loading assemblies other than those explicitly described herein may be employed in method 1500 in other embodiments.

In method 1500 at step 1510, an operator may feed ends of segments of a fiber optic cable (e.g., fiber optic cable 112) through opposing cable funnels (e.g., cable funnels 310) into an inner enclosure (e.g., inner enclosure 304) of the splice case. In some embodiments, as described above, the ends may be fed through holes in corresponding cable channel 602 and adjacent cable recess 902 into splice cavity 904, where the segment of the fiber optic cable may be retained by way of cable gland 804. In some examples, each segment of the fiber optic cable may be coupled with (e.g., helically wrapped about) the powerline conductor. Further, at this point in method 1500, the splice case may be positioned at or near ground level, which may result in an amount of slack in the segment of the fiber optic cable when the splice case is ultimately positioned at the powerline conductor for attachment thereto. In other examples, the splice case may be located closer to the powerline conductor, which may result in less slack in the fiber optic cable segments.

At step 1520, the ends of corresponding optical fibers of the segments of the fiber optic cable may then be joined, such as by way of an optical fiber splice tray, thus joining the two segments to extend the communication path provided by those segments. Thereafter, at step 1530, the optical fiber splice tray may be installed or secured in the inner enclosure (e.g., in splice cavity 904). Also, at step 1540, the optical fiber splice case may be secured in preparation for installation on the powerline conductor. In some example, the splice case may be secured by way of installing a lid (e.g., inner enclosure lid 606, possibly in conjunction with retaining ring 608) over splice cavity 904 to render splice cavity 904 weatherproof.

At step 1550, the splice case may be moved into a position proximate the powerline conductor while rotating the inner enclosure to take up slack in the segments of the fiber optic cable. In some embodiments, the splice case may be captured by a loading assembly (e.g., loading assembly 1200) and raised or otherwise moved into the position proximate the powerline conductor using the loading assembly. Also, as described above, the same loading assembly may be engaged with the inner enclosure of the splice case to rotate the inner enclosure to retract any slack in the segments of fiber optic cable that may be created when moving the splice case into position at the powerline conductor. Further, this retraction may occur while the splice case is being moved and/or after the splice case is in position at the powerline conductor. At step 1560, the splice case may then be secured to the powerline conductor (e.g., using case clamps 306 in conjunction with clamping bolts 308).

As indicated above, the loading assembly may also be employed to relocate the splice case away from the powerline conductor after the splice case has been de-clamped to enable repair or replacement tasks associated with the splice case or the fiber optic cable prior to reinstallation of the splice case, as described in method 1500.

FIGS. 16-23 are various views of an exemplary clamp 1600 that may serve as cable clamp 106 of FIG. 1 to secure a fiber optic cable (e.g., fiber optic cable 112) to a powerline conductor (e.g., powerline conductor 101). In at least some embodiments, multiple clamps 1600 may be deployed on powerline conductor 101 at approximately some predetermined interval along powerline conductor 101.

Figure 16:
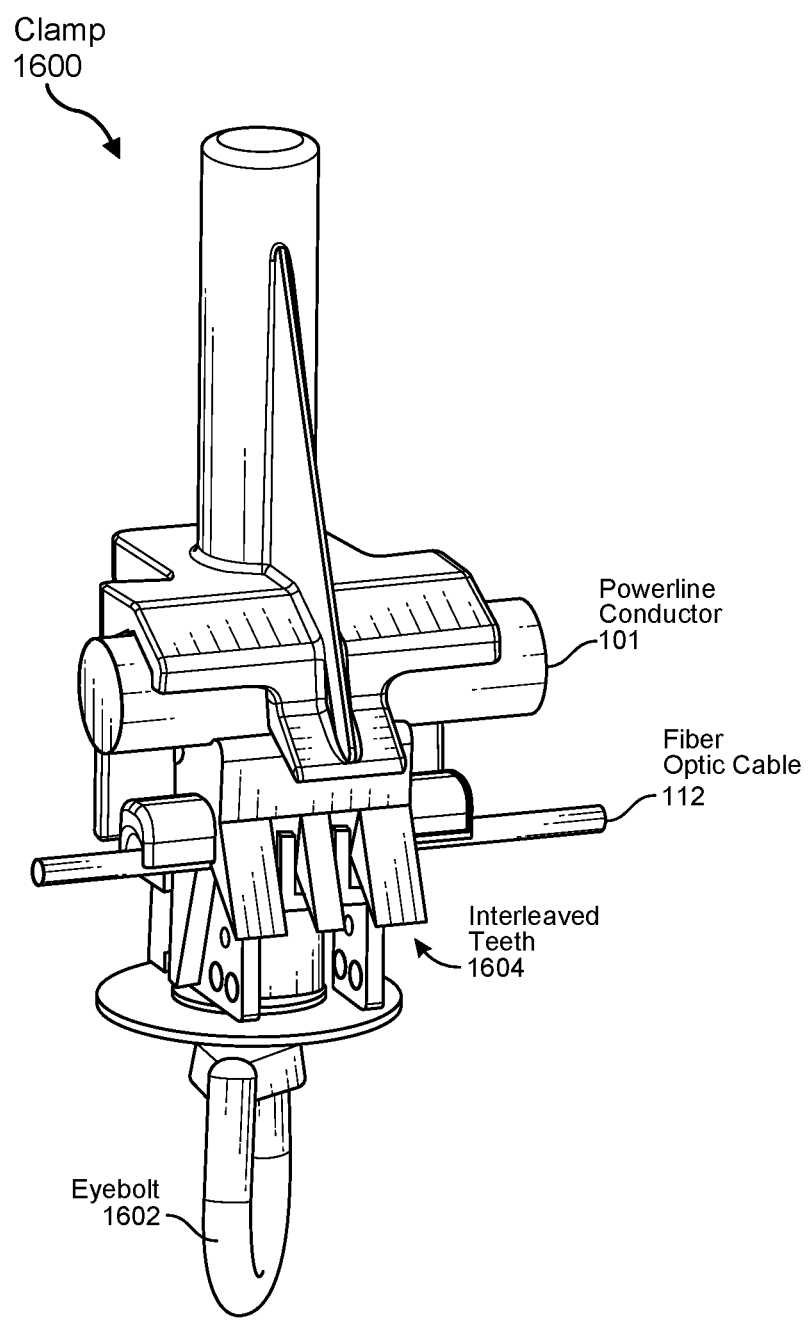
FIG. 16 is a perspective view of an exemplary clamp in an installed configuration for securing a fiber optic cable onto a powerline conductor, such as in the operating environment of FIG. 1.

FIG. 16, for example, is a perspective view of clamp 1600 in an installed configuration for securing fiber optic cable 112 to powerline conductor 101. As shown, clamp 1600 retains powerline conductor 101 and fiber optic cable 112 separately by way of actuation of an eyebolt 1602 extending through various components of clamp 1600. Further, clamp 1600 may be configured such that fiber optic cable 112 is captured and retained using interleaved teeth 1604 of two different components of clamp 1600.

Figure 17:
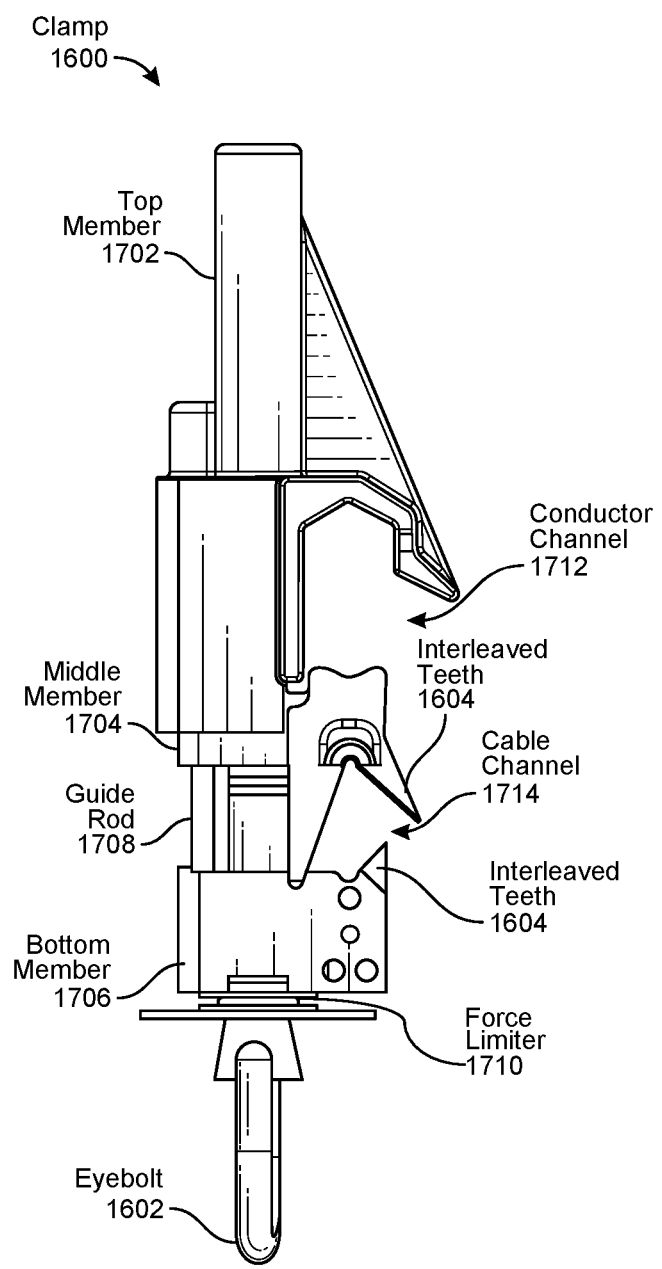
FIG. 17 is a side view of the exemplary clamp of FIG. 16 in an open or uninstalled configuration.

FIGS. 17-21 are side views of clamp 1600, with FIG. 17 depicting clamp 1600 in a fully open or uninstalled configuration, and FIGS. 18-21 showing claim 1600 during progressive stages of installation of clamp 1600 onto powerline conductor 101 and fiber optic cable 112. Beginning with FIG. 17, clamp 1600 is shown to include a top member 1702, a middle member 1704, and a bottom member 1706, aligned in order along eyebolt 1602. In some embodiments, eyebolt 1602 may be configured to be engaged by a standard tool attachable to a hot stick to facilitate remote actuation of eyebolt 1602 by an operator or installer. Also, in some examples, a guide rod 1708 oriented parallel to eyebolt 1602 may be firmly attached to bottom member 1706 and slidably coupled through middle member 1704 and slidably coupled into top member 1702 to retain proper rotational orientation among top member 1702, middle member 1704, and bottom member 1706 about eyebolt 1602.

As shown in FIG. 17, a space between operative surfaces of top member 1702 and middle member 1704 is depicted as a conductor channel 1712 in which powerline conductor 101 is inserted, and a space between another operative surface of middle member 1704 and an operative surface of bottom member 1706 is labeled a cable channel 1714 in which fiber optic cable 112 is captured. In some examples, conductor channel 1712 may be sized to access and clamp powerline conductors 101 ranging from 6 millimeters (mm) to over 21 mm in diameter, such as conductors often employed as distribution lines. In yet other embodiments, conductor channel 1712 may be sized to access and clamp powerline conductors 101 ranging from approximately 15-40 mm in diameter, such as those often used as transmission lines.

In some embodiments, a lower portion of eyebolt 1602 (e.g., a flange, a cushioning component, and/or other component) may rotatably retain bottom member 1706 such that eyebolt 1602 may be rotated while bottom member 1706 is retained near eyebolt 1602. Also, in some examples, top member 1702 may include a compression spring (not shown in the drawings) surrounding eyebolt 1602 that couples top member 1702 and middle member 1704 such that a maximum size for conductor channel 1712 is limited, thus increasing the size of cable channel 1714. Further, in some embodiments, the maximum length by which eyebolt 1602 may be retracted from top member 1702 may be limited, thus limiting the maximum size of cable channel 1714. Consequently, in some examples, the maximum size of cable channel 1714 may be large enough to capture the largest-diameter fiber optic cable 112 while simultaneously being small enough to prevent capture of the smallest powerline conductor 101 expected to be encountered.

In some embodiments, clamp 1600 may also include a force limiter 1710 (e.g., a Belleville spring stack) between bottom member 1706 and a flange of eyebolt 1602, which may dampen a clamping force between bottom member 1706 and middle member 1704, as imposed on fiber optic cable 112 to protect fiber optic cable 112.

Figure 18:
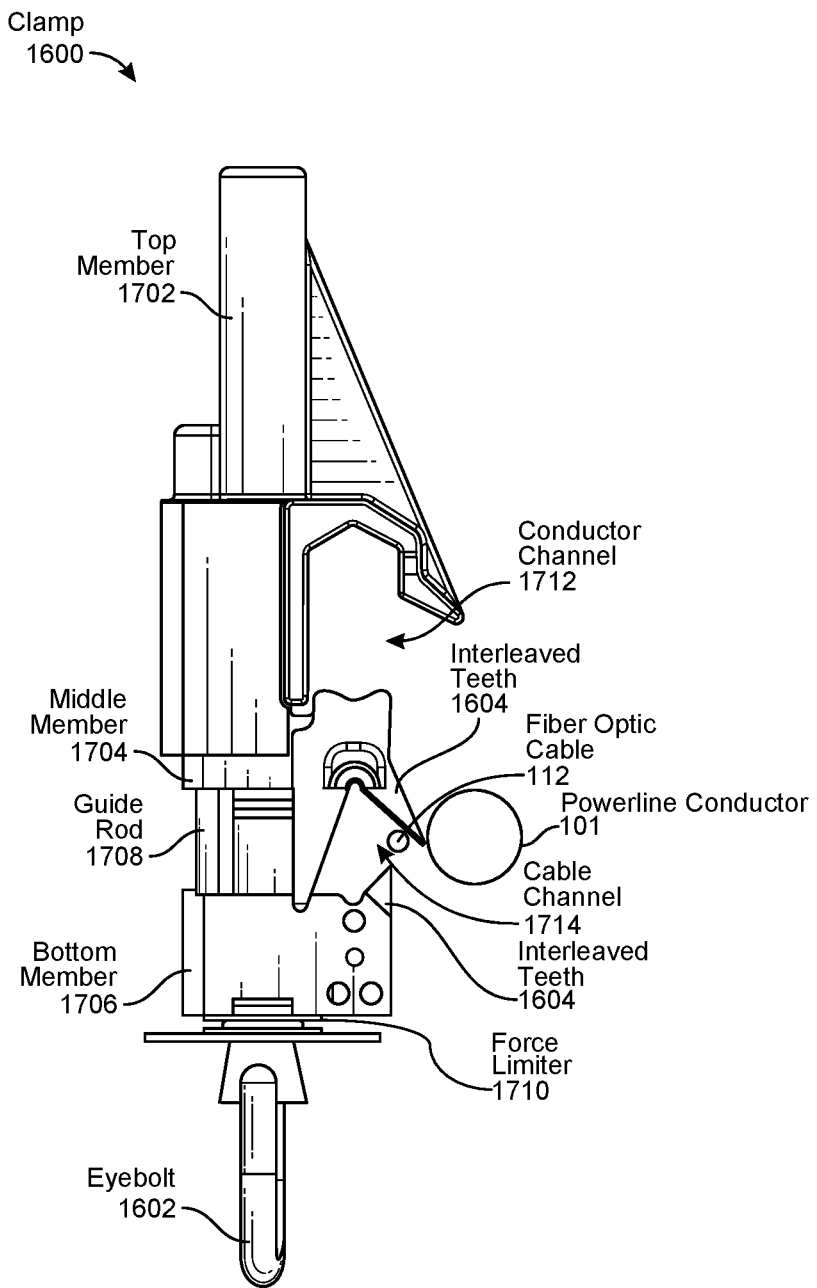
FIGS. 18-21 are side views of the exemplary clamp of FIG. 16 during installation of the clamp onto a powerline conductor and an associated fiber optic cable.
Figure 19:
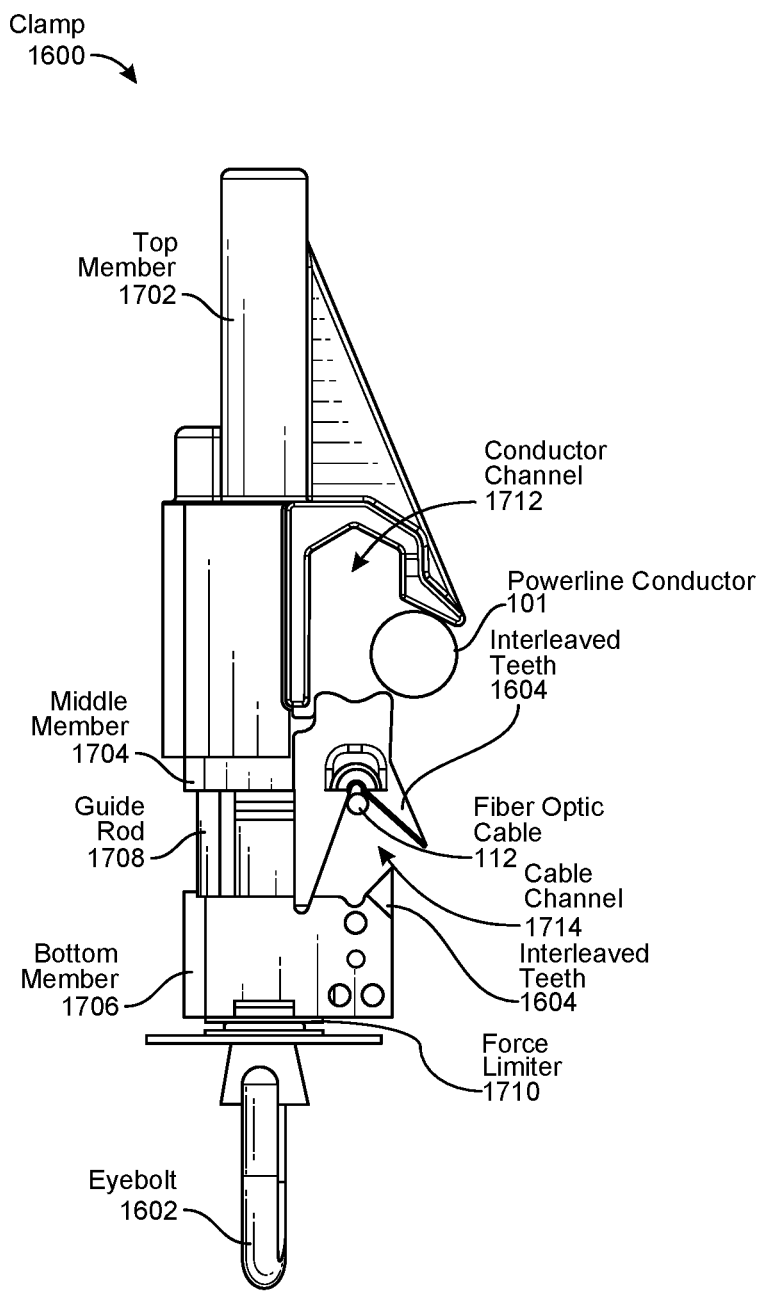
Figure 20:
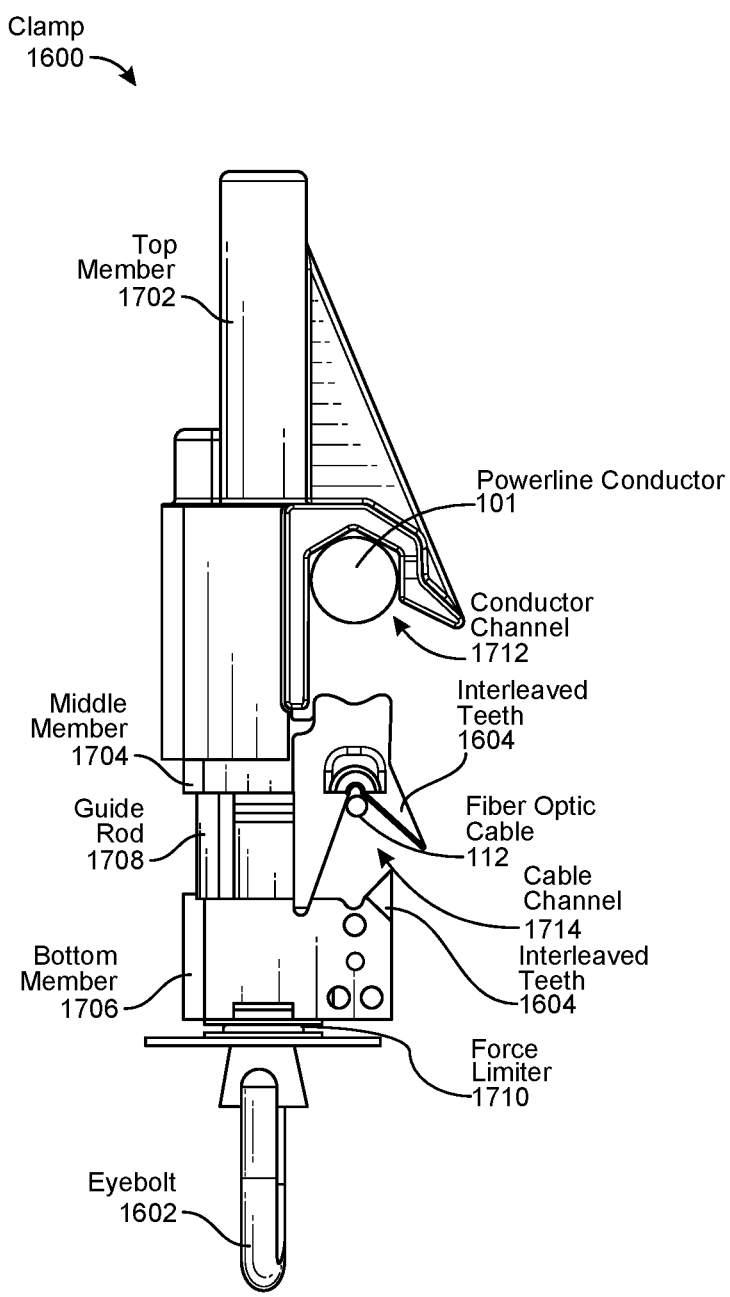

In FIG. 18, clamp 1600 is shown during an operation in which clamp 1600 is being maneuvered by an operator to separate fiber optic cable 112 from powerline conductor 101 using interleaved teeth 1604 of middle member 1704. Once powerline conductor 101 and fiber optic cable 112 are separated, clamp 1600 may be further maneuvered, as shown in FIGS. 19 and 20, until powerline conductor 101 is seated at or near a top of conductor channel 1712 and fiber optic cable 112 is seated at or near a top of cable channel 1714.

Figure 21:
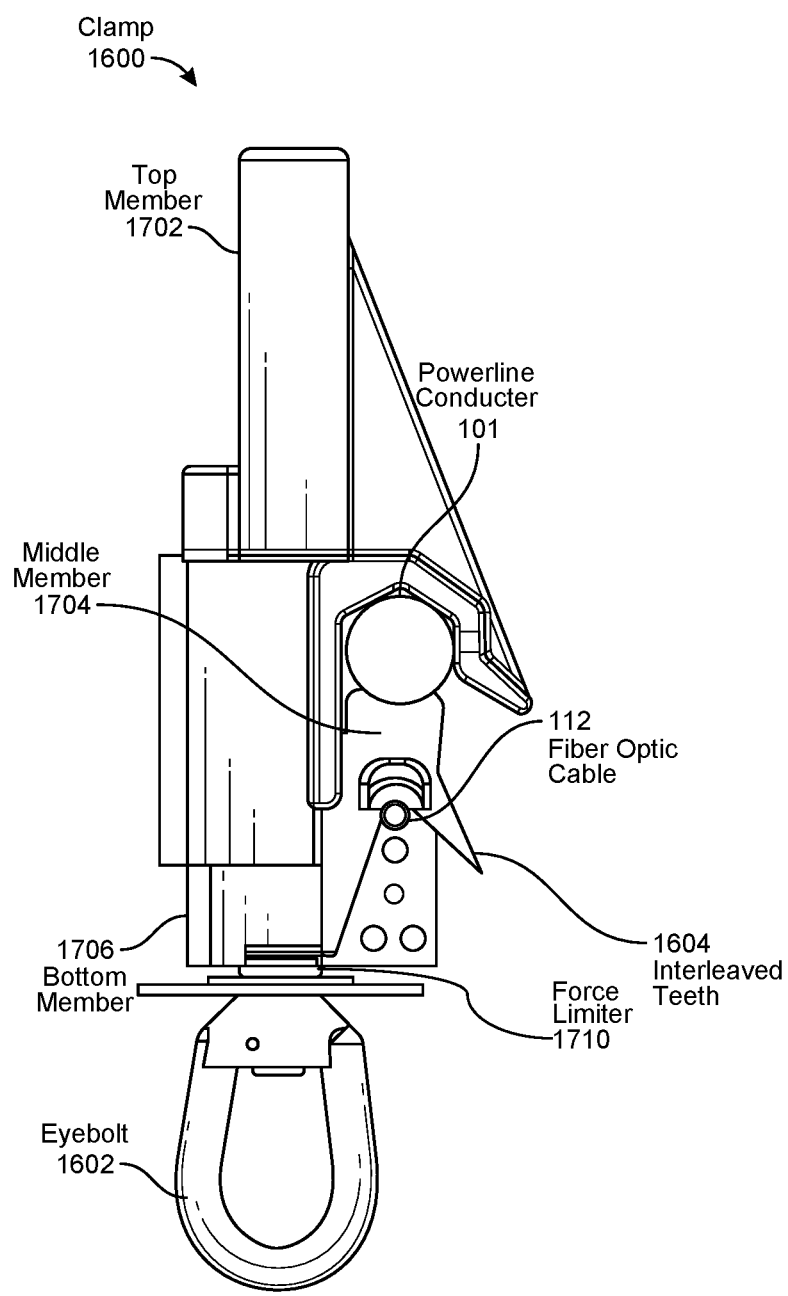

Once powerline conductor 101 and fiber optic cable 112 are appropriately seated, the operator may actuate (e.g., tighten) eyebolt 1602 to close conductor channel 1712 and cable channel 1714 to firmly hold powerline conductor 101 while safely retaining fiber optic cable 112, as illustrated in FIG. 21. More specifically, as eyebolt 1602 is tightened, top member 1702 may be drawn toward bottom member 1706. During this tightening, cable channel 1714 may fully capture fiber optic cable 112 via the meshing of interleaved teeth 1604 prior to top member 1702 and middle member 1704 clamping powerline conductor 101 (e.g., due to the operation of the compression spring in top member 1702). Further, the shape of cable channel 1714, at its smallest, maybe large enough to prevent any damage to fiber optic channel 112 when eyebolt 1602 is fully tightened to clamp powerline conductor 101. Additionally, force limiter 1710, as described above, may compress while clamp 1600 is in the fully tightened or closed state to provide further protection against fiber optic cable 112 damage.

Figure 22:
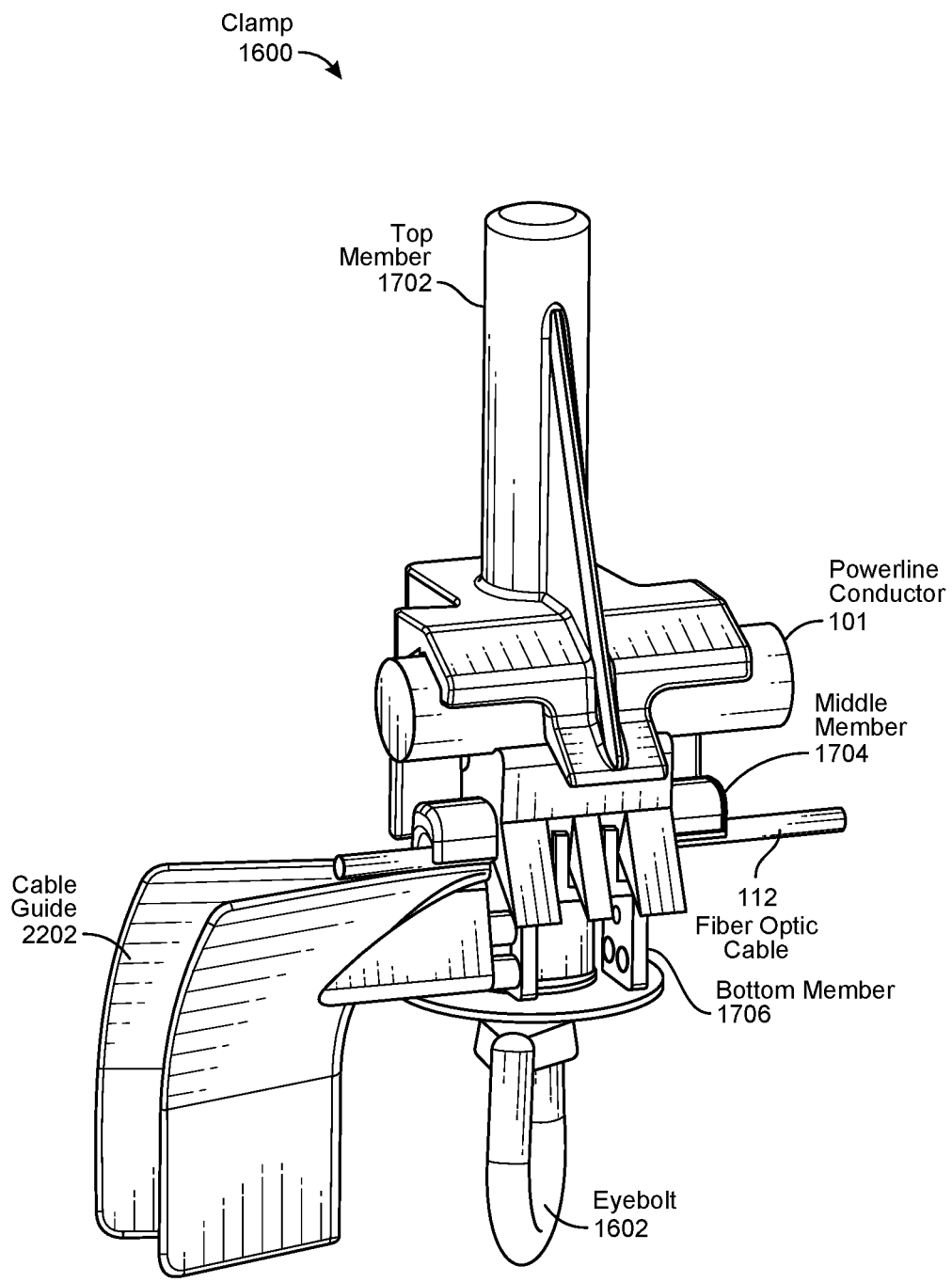
FIG. 22 is a perspective view of the exemplary clamp of FIG. 16 with an exemplary cable guide attached thereto.
Figure 23:
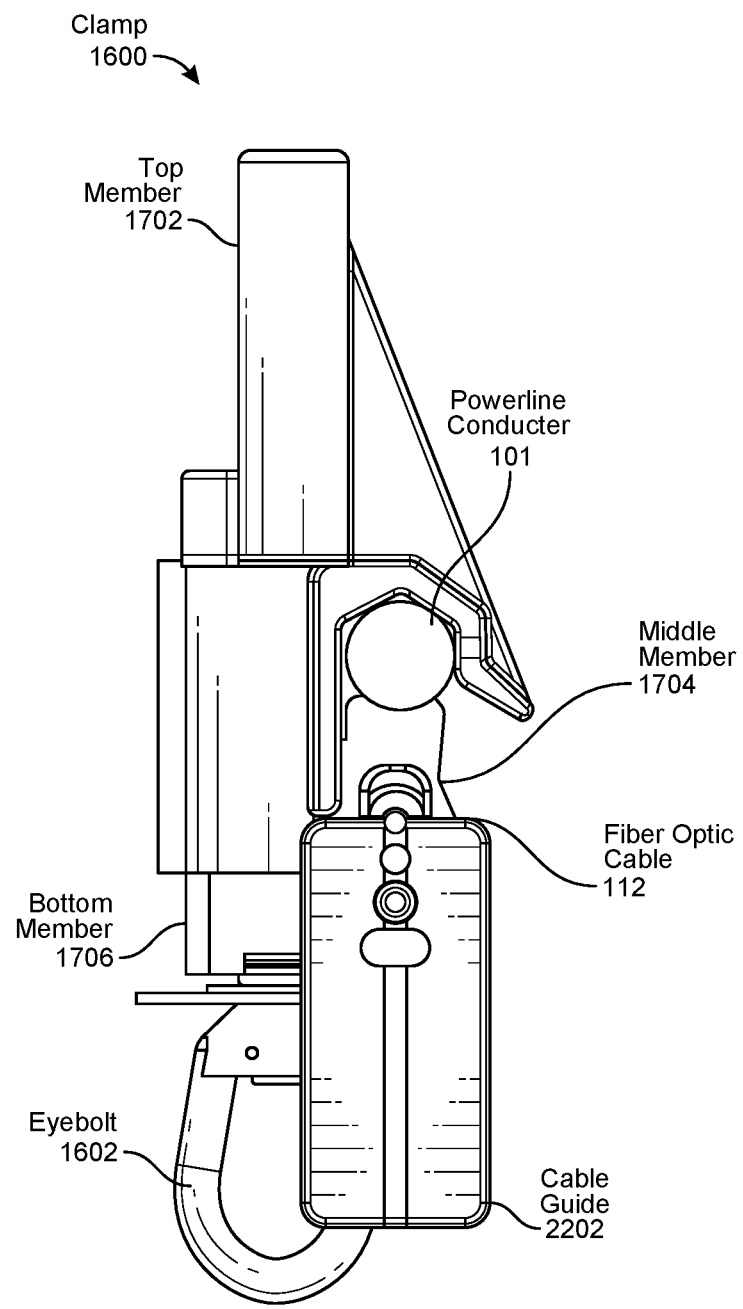
FIG. 23 is an end view of the exemplary claim of FIG. 16 with the exemplary cable guide of FIG. 22 attached thereto.

FIGS. 22 and 23 are a perspective view and an end view, respectively, of clamp 1600 with an exemplary cable guide 2202 attached thereto. In some embodiments, cable guide 2202 may be a plastic component that is attached via screws and/or other fasteners to bottom member 1706. Further, cable guide 2202 may define a channel (e.g., a V-shaped channel) with an arcuate shape that allows some slack in fiber optic cable 112 without allowing optical fiber cable to bend in a manner that violates its minimum bend radius. Use of cable guide 2202 may be beneficial in situations in which a leading portion of fiber optic cable 112 is not wrapped about powerline conductor 101, such as when the leading end of fiber optic cable 112 is being coupled to an end of a subsequent segment of fiber optic cable 112, as described above in conjunction with splice case 300.

Figure 24:
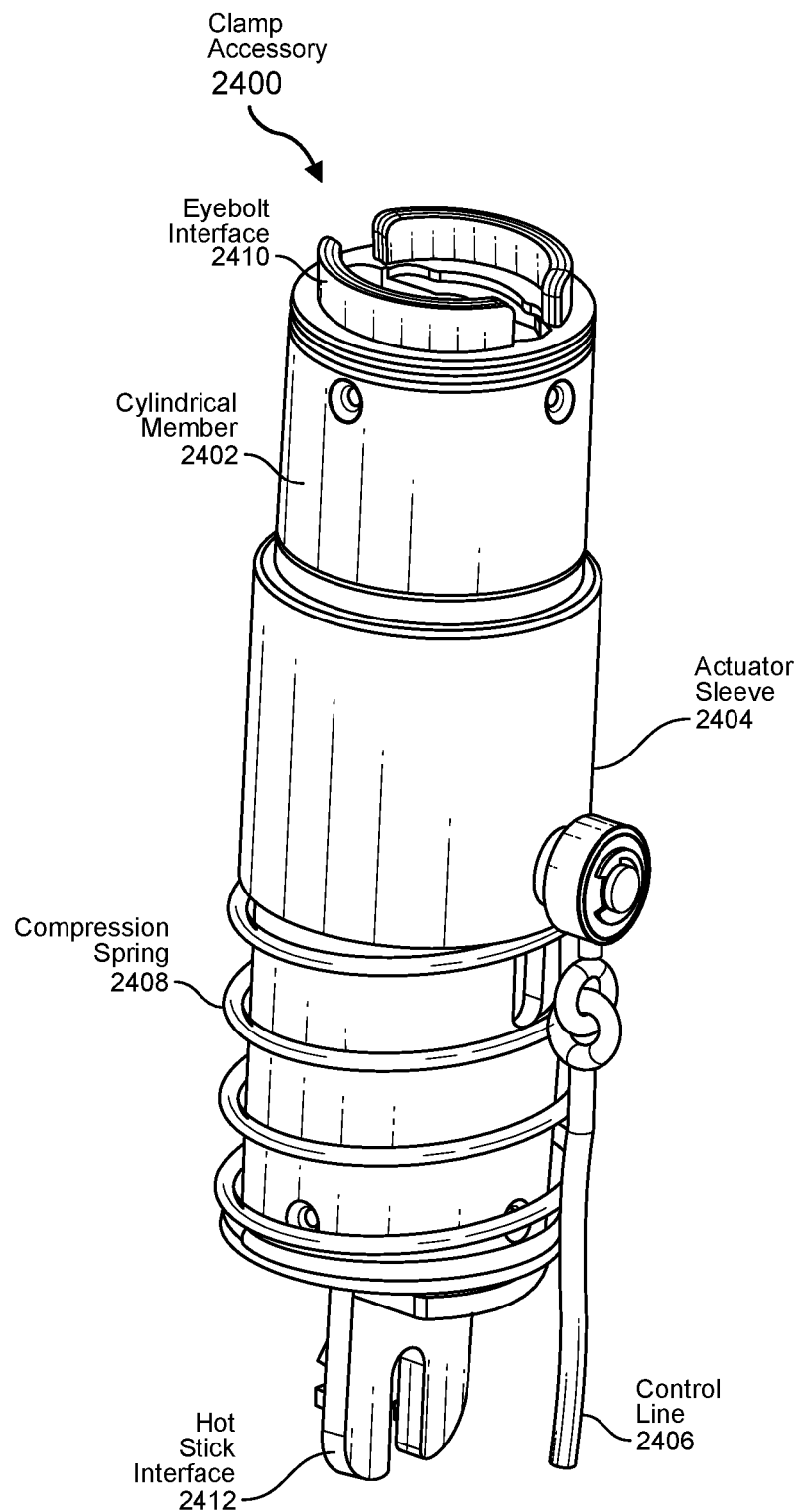
FIG. 24 is a perspective view of an exemplary clamp accessory for coupling a hot stick to the exemplary clamp of FIG. 16 to control the clamp.
Figure 25:
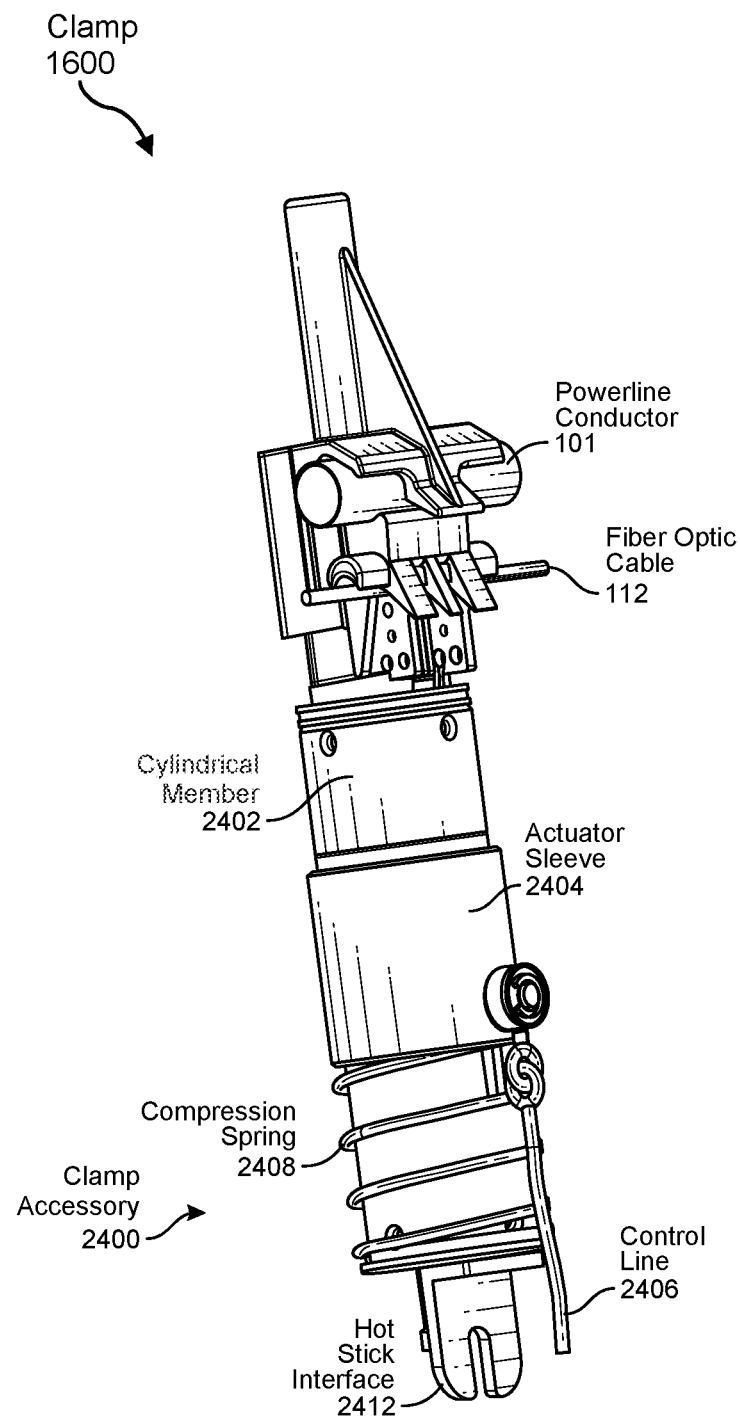
FIG. 25 is a perspective view of the exemplary clamp accessory of FIG. 24 coupled to the exemplary clamp of FIG. 16.

FIG. 24 is a perspective view of an exemplary clamp accessory 2400 for coupling a hot stick to clamp 1600 (e.g., to actuate eyebolt 1602), and FIG. 25 is a perspective view of clamp accessory 2400 coupled to clamp 1600. As shown, clamp accessory 2400 may include a cylindrical member 2402 that has a proximal end that is coupled with a hot stick interface 2412 and has a distal end coupled with an eyebolt interface 2410. Further, clamp accessory 2400 may include a actuator sleeve 2404 that is slidably coupled at or near the proximal end of cylindrical member 2402 by way of a compression spring 2408. Additionally, actuator sleeve 2404 may be actuated by way of a control line 2406 that may be pulled by an operator or lineman.

In operation, clamp accessory 2400 may be installed at a distal end of a standard hot stick at hot stick interface 2412. An operator may then maneuver clamp accessory 2400 to engage eyebolt 1602 to operate clamp 1600. In some embodiments, eyebolt interface 2410 may be slid onto the operative (proximal) end of eyebolt 1602 to firmly capture eyebolt 1602 such that eyebolt 1602 may be tightened or loosened using the hot stick via clamp accessory 2400. Further, in some examples, eyebolt interface 2410 may include a latch mechanism (not shown in FIGS. 24 and 25) that firmly captures eyebolt 1602, possibly without operating actuator sleeve 2404. To then release clamp accessory 2400 and the attached hot stick from eyebolt 1602 (e.g., after fully tightening eyebolt 1602), the operator may pull control line 2406 to temporarily compress compression spring 2408 with actuator sleeve 2404. This movement of actuator sleeve 2404 may then release the latch mechanism that captures eyebolt 1602 using eyebolt interface 2410, thereby releasing clamp accessory 2400 from clamp 1600.

Figure 26:
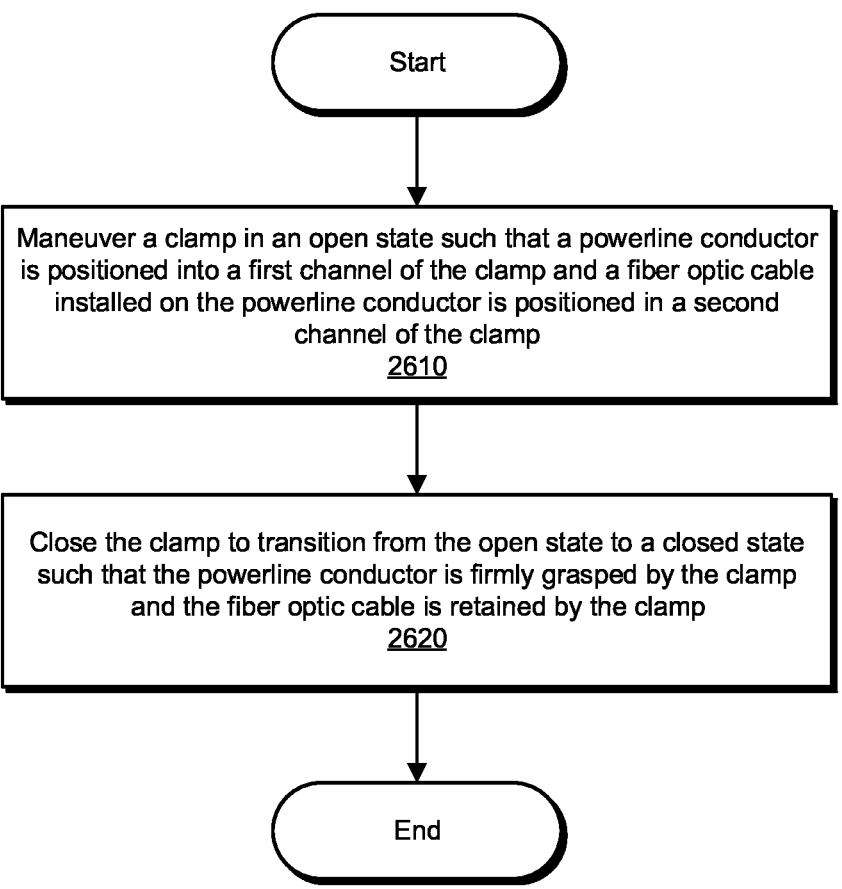
FIG. 26 is a flow diagram of an exemplary method for installing a clamp onto a powerline conductor and an associated fiber optic cable.

FIG. 26 is a flow diagram of an exemplary method 2600 for installing a clamp (e.g., clamp 1600) onto a powerline conductor (e.g., powerline conductor 101) and an associated fiber optic cable (e.g., fiber optic cable 112). In method 2600, at step 1610, the clamp may be maneuvered while in an open state or configuration (e.g., as depicted in FIG. 17) such that the powerline conductor is positioned into a first channel of the clamp (e.g., conductor channel 1712, as shown in FIGS. 18-20) and the fiber optic cable is positioned in a second channel of the clamp (e.g., cable channel 1714, as illustrated in FIGS. 18-20). At step 1620, the clamp may be closed (e.g., via tightening of eyebolt 1602) to transition from the open state to a closed state (e.g., as illustrated in FIG. 21) such that the powerline conductor is firmly grasped by the clamp and the fiber optic cable is safely retained by the clamp (e.g., using interleaved teeth 1604).

In view of the discussion above in conjunction with FIGS. 1-26, embodiments of the splice case and associated installation devices and methods may facilitate the coupling of optical fibers of consecutive segments of fiber optic cable installed on a powerline conductor at some distance away from the powerline conductor (e.g., at or near ground level), thus enhancing safety during the coupling or splicing process. Moreover, by installing the splice case at the powerline conductor, as opposed to on a utility tower closer to ground level, special components typically required for such installations, such as a phase-to-ground transition, would not be required, and sabotage of such components may be less likely due to the location of the splice case well above ground. Further, by employing the cable clamp and corresponding accessories and methods, as described above, fiber optic installation and stabilization may be safely carried out while also reducing or eliminating damage to the fiber optic cable damage.

Example Embodiments

Example 1: A fiber optic cable splice case may include (1) an outer enclosure including a plurality of cable funnels, where each cable funnel defines a corresponding path from an exterior to an interior of the outer enclosure, (2) a clamp connected to the exterior of the outer enclosure, where the clamp is configured to attach the outer enclosure to a powerline conductor, and (3) an inner enclosure positioned at least partially within, and rotatably coupled to, the outer enclosure, where the inner enclosure defines (a) a splice cavity within the inner enclosure, where the splice cavity is configured to store an optical fiber splice tray for coupling corresponding optical fibers of each of a pair of fiber optic cable segments and (b) a cable channel about an exterior of the inner enclosure, wherein the cable channel is configured to carry a portion of each of the pair of fiber optic cable segments between the cable funnels and the splice cavity.

Example 2: The fiber optic cable splice case of Example 1, where the plurality of cable funnels may include two cable funnels positioned at opposing ends of the outer enclosure.

Example 3: The fiber optic cable splice case of Example 2, where the opposing ends of the outer enclosure may align with the powerline conductor when the clamp attaches the outer enclosure to the powerline conductor.

Example 4: The fiber optic cable splice case of any one of Examples 1, 2, or 3, where each of the plurality of cable funnels may be shaped to resist bending of the pair of fiber optic cable segments beyond a minimum bend radius.

Example 5: The fiber optic cable splice case of any one of Examples 1, 2, or 3, where (1) the inner enclosure may further include a cable gland for each of the pair of fiber optic cable segments and (2) each cable gland may retain a corresponding one of the pair of fiber optic cable segments at the inner enclosure.

Example 6: The fiber optic cable splice case of any one of Examples 1, 2, or 3, where, when the inner enclosure is rotated in a first direction relative to the outer enclosure, the inner enclosure may draw a portion of each of the pair of fiber optic cable segments into the outer enclosure through a corresponding one of the plurality of cable funnels and store the portion of each of the pair of fiber optic cable segments in the cable channel.

Example 7: The fiber optic cable splice case of Example 6, where the outer enclosure may further include at least one cable guide that retains the portion of each of the pair of fiber optic cable segments while the inner enclosure is rotated in the first direction relative to the outer enclosure.

Example 8: The fiber optic cable splice cable of Example 6, where the splice case may further include a retention feature that releasably prevents rotation of the inner enclosure relative to the outer enclosure at least in a second direction opposite the first direction.

Example 9: The fiber optic cable splice case of Example 6, where the cable channel may include a U-shaped channel that retains the portion of each of the pair of fiber optic cable segments within the cable channel.

Example 10: The fiber optic cable splice case of any one of Examples 1, 2, or 3, where each of the plurality of cable funnels may be positioned completely within the outer enclosure.

Example 11: The fiber optic cable splice case of any one of Examples 1, 2, or 3, where splice case may further include an inner enclosure lid that engages the inner enclosure to cover the splice cavity.

Example 12: The fiber optic cable splice case of Example 11, where (1) the inner enclosure lid may define at least one pair of engagement holes positioned opposite each other across a center of rotation of the inner enclosure lid and (2) each of the at least one pair of engagement holes may be configured to be engaged by a pair of engagement pins of a loading device to rotate the inner enclosure to reduce slack in the pair of fiber optic cable segments while the pair of fiber optic cable segments are coupled to the powerline conductor.

Example 13: The fiber optic cable splice case of any one of Examples 1, 2, or 3, where the splice case may further include a clamp standoff connecting the clamp to the outer enclosure, where the clamp standoff comprises a tracking resistant material.

Example 14: The fiber optic cable splice case of any one of Examples 1, 2, or 3, where the outer enclosure may include a tracking resistant material.

Example 15: A method may include (1) feeding a portion of a first fiber optic cable segment through a first cable funnel of an outer enclosure of a fiber optic cable splice case into an inner enclosure of the fiber optic cable splice case, where the inner enclosure is positioned at least partially within the outer enclosure, (2) feeding a portion of a second fiber optic cable segment into a second cable funnel of the outer enclosure into the inner enclosure, (3) joining an end of each of a plurality of optical fibers of the first fiber optic cable segment to an end of a corresponding one of a plurality of optical fibers of the second fiber optic cable segment, (4) securing the joined ends within a splice cavity of the inner enclosure, (5) moving the optical fiber cable splice case into a position proximate a powerline conductor to which the first fiber optic cable segment and the second fiber optic cable segment are coupled, (6) retracting an excess of the first fiber optic cable segment and an excess of the second fiber optic cable segment into the outer enclosure, and (7) securing the fiber optic cable splice case to the powerline conductor at the position.

Example 16: The method of Example 15, where (1) the inner enclosure may be rotatably coupled to the outer enclosure and (2) the method may further include rotating the inner enclosure relative to the outer enclosure to retract the excess of the first fiber optic cable segment and the excess of the second fiber optic cable segment by wrapping the excess of the first fiber optic cable segment and the excess of the second fiber optic cable segment onto a cable channel defined about an exterior of the inner enclosure.

Example 17: The method of Example 16, where the method may further include locking, after retracting the excess of the first fiber optic cable segment and the excess of the second fiber optic cable segment into the outer enclosure, a current rotational position of the inner enclosure relative to the outer enclosure.

Example 18: The method of any one of Examples 15, 16, or 17, where the first cable funnel and the second cable funnel may be located at opposing ends of the outer enclosure.

Example 19: The method of Example 18, where the opposing ends of the outer enclosure may align with the powerline conductor when the fiber optic cable splice case is secured to the powerline conductor at the position.

Example 20: A fiber optic cable splice case may include (1) an outer enclosure including a first opening and a second opening, where the first opening and the second opening each defines a path from an exterior to an interior of the outer enclosure, (2) a clamp configured to attach the outer enclosure to a powerline conductor, and (3) an inner enclosure positioned at least partially within, and rotatably coupled to, the outer enclosure, where the inner enclosure defines (a) a splice cavity within the inner enclosure, where the splice cavity is configured to store coupled ends of corresponding optical fibers of a first fiber optic cable segment and a second fiber optic cable segment and (b) a cable channel about an exterior of the inner enclosure, where the cable channel is configured to (i) carry a portion of the first fiber optic cable segment between the first opening and the splice cavity and (ii) carry a portion of the second fiber optic cable segment between the second opening and the splice cavity.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A cable splice case comprising:
    an outer enclosure comprising a plurality of cable funnels, wherein each cable funnel defines a corresponding path from an exterior to an interior of the outer enclosure; and
    an inner enclosure positioned at least partially within, and rotatably coupled to, the outer enclosure, wherein the inner enclosure defines:
        a splice cavity configured to store a splice tray for coupling a pair of cable segments to each other; and
        a cable channel configured to carry a portion of each cable segment of the pair of cable segments between the cable funnels and the splice cavity.

2. The cable splice case of claim 1, wherein the plurality of cable funnels comprises two cable funnels positioned at opposing ends of the outer enclosure.

3. The cable splice case of claim 1, further comprising a clamp connected to the exterior of the outer enclosure, wherein the clamp is configured to attach the outer enclosure to a powerline conductor.

4. The cable splice case of claim 3, further comprising a clamp standoff connecting the outer enclosure to the clamp, wherein the clamp standoff comprises a tracking resistant material.

5. The cable splice case of claim 4, wherein the tracking resistant material of the clamp standoff is nonmetallic.

6. The cable splice case of claim 1, wherein each of the plurality of cable funnels is shaped to resist bending of the pair of cable segments beyond a minimum bend radius of the cable segments.

7. The cable splice case of claim 1, wherein the splice cavity is within the inner enclosure.

8. The cable splice case of claim 1, wherein, when the inner enclosure is rotated in a first direction relative to the outer enclosure, the inner enclosure draws a portion of each of the pair of cable segments into the outer enclosure through a corresponding one of the plurality of cable funnels and stores the portion of each of the pair of cable segments in the cable channel.

9. The cable splice case of claim 8, wherein the outer enclosure further comprises at least one cable guide that retains the portion of each of the pair of cable segments while the inner enclosure is rotated in the first direction relative to the outer enclosure.

10. The cable splice case of claim 8, further comprising a retention feature that releasably prevents rotation of the inner enclosure relative to the outer enclosure at least in a second direction opposite the first direction.

11. The cable splice case of claim 1, wherein the cable channel is positioned about an exterior of the inner enclosure.

12. The cable splice case of claim 1, wherein the pair of cable segments comprises a pair of fiber optic cable segments.

13. The cable splice case of claim 1, further comprising an inner enclosure lid that engages the inner enclosure to cover the splice cavity.

14. The cable splice case of claim 1, further comprising a hub rotatably coupling the inner enclosure to the outer enclosure.

15. The fiber optic cable splice case of claim 1, wherein the outer enclosure comprises a tracking resistant material.

16. The cable splice case of claim 15, wherein the tracking resistant material of the outer enclosure is nonmetallic.

17. A method comprising:
    feeding a portion of a first cable segment through a first cable funnel of an outer enclosure of a cable splice case into an inner enclosure of the cable splice case, wherein the inner enclosure is positioned at least partially within the outer enclosure;
    feeding a portion of a second cable segment into a second cable funnel of the outer enclosure into the inner enclosure;
    joining an end of the first cable segment to an end of the second cable segment;
    securing the joined ends within a splice cavity of the inner enclosure; and
    retracting an excess of the first cable segment and an excess of the second cable segment into the outer enclosure.

18. The method of claim 17, wherein:
    the inner enclosure is rotatably coupled to the outer enclosure; and
    the method further comprises rotating the inner enclosure relative to the outer enclosure to retract the excess of the first cable segment and the excess of the second cable segment by wrapping the excess of the first cable segment and the excess of the second cable segment onto a cable channel positioned about an exterior of the inner enclosure.

19. The method of claim 17, wherein the first cable segment and the second cable segment comprise a first fiber optic cable segment and a second fiber optic cable segment.

20. A cable splice case comprising:
    an outer enclosure including a first opening and a second opening, wherein the first opening defines a first path for a first cable segment to pass from an exterior to an interior of the outer enclosure and the second opening defines a second path from the exterior to the interior of the outer enclosure; and
    an inner enclosure positioned at least partially within, and rotatably coupled to, the outer enclosure, wherein the inner enclosure defines:
        a splice cavity configured to store coupled ends of a first cable segment and a second cable segment; and
        a cable channel configured to carry a portion of the first cable segment and a portion of the second cable segment.

\* \* \* \* \*